(12) United States Patent
Lim et al.

(10) Patent No.: US 9,671,648 B2
(45) Date of Patent: Jun. 6, 2017

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Ho Lim, Suwon-si (KR); Tae Min Kim, Seoul (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/956,014

(22) Filed: Dec. 1, 2015

(65) Prior Publication Data
US 2016/0209708 A1 Jul. 21, 2016

(30) Foreign Application Priority Data

Jan. 20, 2015 (KR) .................. 10-2015-0009499

(51) Int. Cl.
*C09K 19/00* (2006.01)
*G02F 1/1337* (2006.01)
(Continued)

(52) U.S. Cl.
CPC ...... *G02F 1/133711* (2013.01); *G02F 1/1341* (2013.01); *G02F 1/13624* (2013.01);
(Continued)

(58) Field of Classification Search
CPC ......... G02F 1/133711; G02F 1/133723; G02F 1/13378; G02F 1/133788; G02F 1/133345;
(Continued)

(56) References Cited

U.S. PATENT DOCUMENTS

2016/0231625 A1* 8/2016 Kong ................ G02F 1/133788

FOREIGN PATENT DOCUMENTS

KR   10-2010-0129406 A   12/2010
KR       10-1097647 B1   12/2011
(Continued)

*Primary Examiner* — Ruiyun Zhang
(74) *Attorney, Agent, or Firm* — Robert E. Bushnell, Esq.

(57) ABSTRACT

A liquid crystal display includes a first alignment layer positioned in a first insulation substrate and a second alignment layer positioned in a second insulation substrate; and a liquid crystal layer positioned between the first insulation substrate and the second insulation substrate, in which the first alignment layer and the second alignment layer include an additive, and the additive is a mixture of two or more reactive mesogens selected from the group consisting of Chemical Formulas 1-1 to 1-15:

(1-1)

(1-2)

(Continued)

Assemble

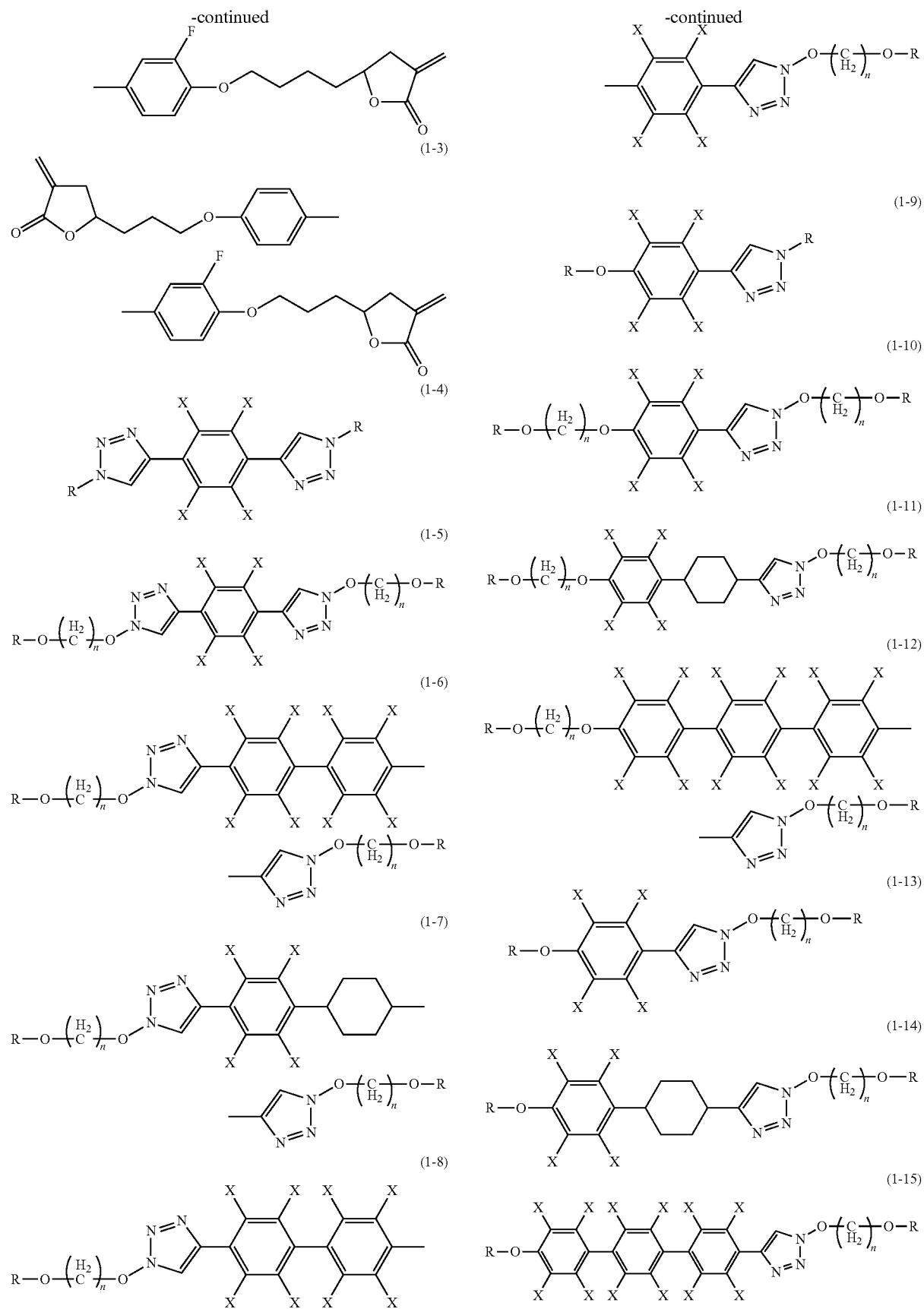

In Chemical Formulas 1-4 to 1-15, X's are each independently H, $CH_3$, $(CH_2)_nCH_3$, F, Br, I, OH, $C_3H_7$, $NH_2$, or CN, R's are each independently any one of

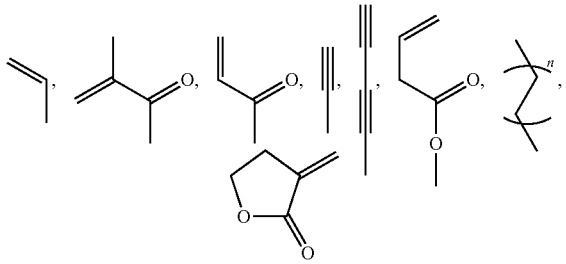

and n is 1 to 20.

20 Claims, 12 Drawing Sheets

(51) Int. Cl.
*G02F 1/1341* (2006.01)
*G02F 1/1362* (2006.01)

(52) U.S. Cl.
CPC .......... *G02F 1/133788* (2013.01); *G02F 2001/133726* (2013.01); *Y10T 428/10* (2015.01); *Y10T 428/1005* (2015.01); *Y10T 428/1023* (2015.01)

(58) Field of Classification Search
CPC ... G02F 1/133703; G02F 2001/133726; C09K 19/56; C09K 2019/0448; C09K 2019/122; Y10T 428/10; Y10T 428/1005; Y10T 428/1023
USPC .......... 428/1.1, 1.2, 1.26; 349/127, 123; 252/299.01, 299.61; 427/553
See application file for complete search history.

(56) References Cited

FOREIGN PATENT DOCUMENTS

| KR | 10-2012-0011796 A | 2/2012 |
| KR | 10-2014-0024222 A | 2/2014 |

* cited by examiner

Light leakage is not observed

1000 ppm

Light leakage is not observed

1600 ppm 2300 ppm 3000 ppm

Light leakage is not observed

Total reactive mesogen content=3000ppm

Film coat

ODF

Assemble

Iso (Anneal)

UV

LIQUID CRYSTAL DISPLAY AND METHOD OF MANUFACTURING THE SAME

CLAIM OF PRIORITY

This application claims the priority to and all the benefits accruing under 35 U.S.C. §119 of Korean Patent Application No. 10-2015-0009499 filed in the Korean Intellectual Property Office (KIPO) on Jan. 20, 2015, the entire contents of which are incorporated herein by reference.

BACKGROUND OF THE INVENTION

1. Field of Disclosure

The present invention relates to a liquid crystal display and a method of manufacturing the same.

2. Description of the Related Art

A liquid crystal display is currently one of the most widely used flat panel displays, and includes two display panels with field generating electrodes such as a pixel electrode and a common electrode, and a liquid crystal layer interposed therebetween. The liquid crystal display displays an image by applying a voltage to a field generating electrode to generate an electric field on the liquid crystal layer, determining directions of liquid crystal molecules of the liquid crystal layer therethrough, and controlling polarization of incident light.

Among the liquid crystal displays, a vertically aligned (VA) mode liquid crystal display in which long axes of the liquid crystal molecules are arranged to be vertical to upper and lower panels while electric fields are not applied comes into the spotlight because a contrast ratio is large and it is easy to implement a wide standard viewing angle.

In the vertically aligned (VA) mode liquid crystal display, a plurality of domains in which alignment directions of liquid crystals are different from each other may be formed in one pixel in order to implement the wide viewing angle. A method such as forming a cutout such as a fine slit or forming a protrusion on the field generating electrode is used as means for forming the plurality of domains. In this method, the liquid crystals are aligned in a direction that is vertical to a fringe field by the fringe field formed between an edge of the cutout or the protrusion and the field generating electrode facing the edge, and thus the plurality of domains may be formed.

The vertically aligned (VA) mode liquid crystal display may have poor lateral surface visibility as compared to front surface visibility, and in order to solve this, a method of dividing one pixel into two sub-pixels and making voltages of the two sub-pixels different is proposed.

Meanwhile, in order to implement the wide viewing angle and increase a response speed of the liquid crystals, a method of allowing the liquid crystals to have a pretilt in a state where an electric field is not applied has been developed. In order to allow the liquid crystals to have the pretilt in various directions, the pretilt may be formed by using an alignment layer where alignment directions are various or adding a reactive mesogen to the alignment layer or the liquid crystal layer and then radiating light in a state where the electric field is applied.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display where an afterimage is improved, and a method of manufacturing the same.

An exemplary embodiment of the present invention provides a liquid crystal display including: a first insulation substrate where a pixel electrode is formed; a second insulation substrate where a common electrode is formed while the second insulation substrate faces the first insulation substrate, a first alignment layer positioned in the first insulation substrate; a second alignment layer positioned in the second insulation substrate; and a liquid crystal layer positioned between the first insulation substrate and the second insulation substrate, in which the first alignment layer and the second alignment layer include an additive, and the additive is a mixture of two or more reactive mesogens selected from the group consisting of the following Chemical Formulas 1-1 to 1-15.

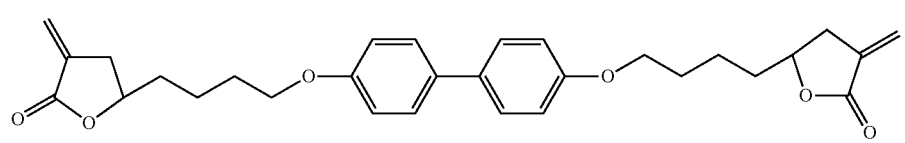

(1-1)

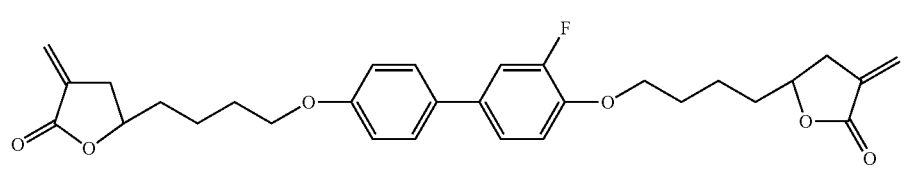

(1-2)

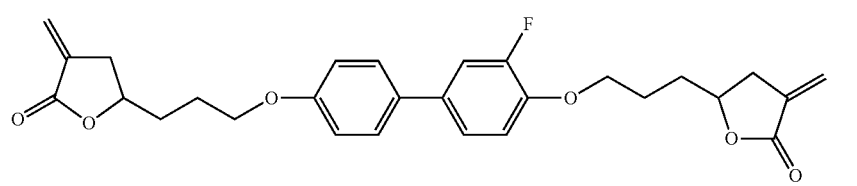

(1-3)

-continued
(1-4)
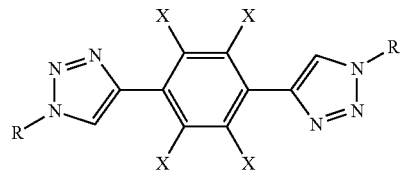
(1-5)
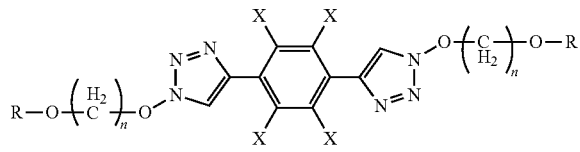
(1-6)
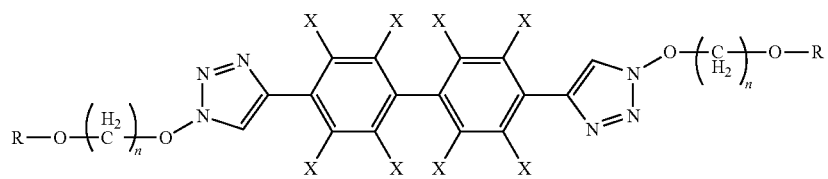
(1-7)
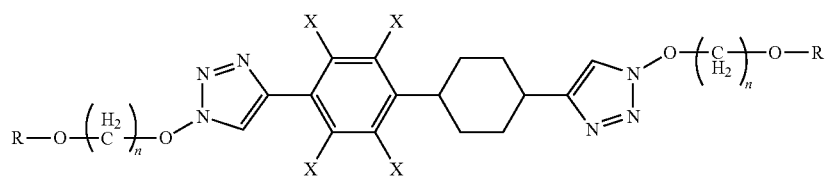
(1-8)
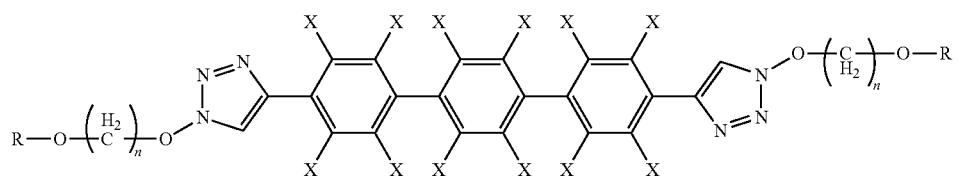
(1-9)
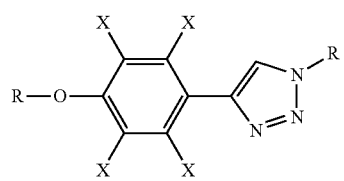
(1-10)
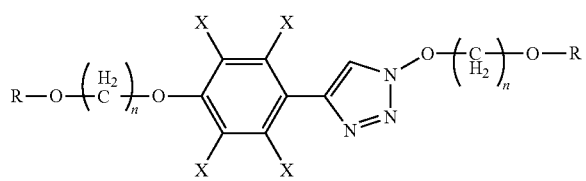
(1-11)
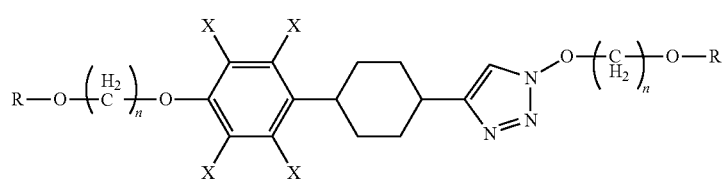
(1-12)
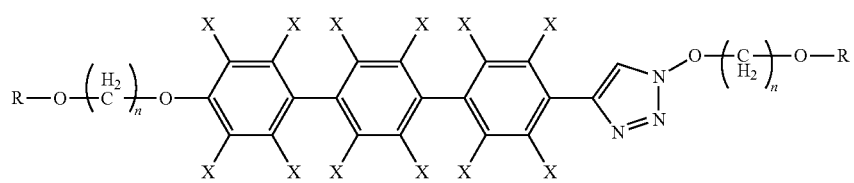
(1-13)
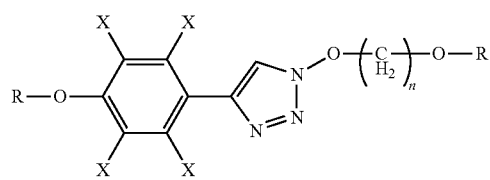
(1-14)
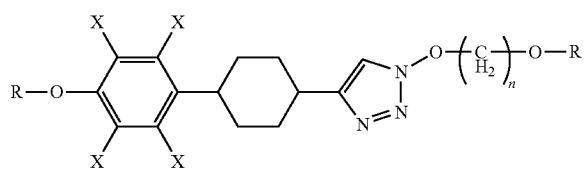

(1-15)

[Chemical structure 1-15]

In Chemical Formulas 1-4 to 1-15, X's are each independently H, CH$_3$, (CH$_2$)$_n$CH$_3$, F, Br, I, OH, C$_3$H$_7$, NH$_2$, or CN, R's are each independently any one of

[Chemical structures of R groups]

and n is 1 to 20.

The additive may be included in a content of 15 wt % to 50 wt % in the alignment layer.

The additive may include two compounds selected from the group consisting of compounds of Chemical Formulas 1-1 to 1-15, and each compound may be included in a content of 15 wt % or less in the alignment layer.

The additive may include each of the compound of Chemical Formula 1-2 and the compound of Chemical Formula 1-3 in a content of 15 wt % or less.

The alignment layer may include a compound represented by the following Chemical Formula 2.

[Chemical Formula 2]

[Chemical structure of Formula 2]

In Chemical Formula 2, A is any one of

[Chemical structures for A]

B is any one of

[Chemical structures for B]

X is any one of $$-O-, \quad -O-\overset{O}{\underset{\|}{C}}-, \quad -O-, \quad -O-\overset{O}{\underset{\|}{C}}-$$

Y is any one of

[Chemical structures for Y]

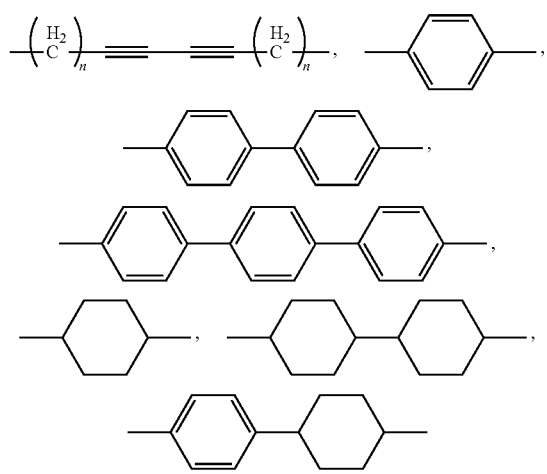
N is any one of
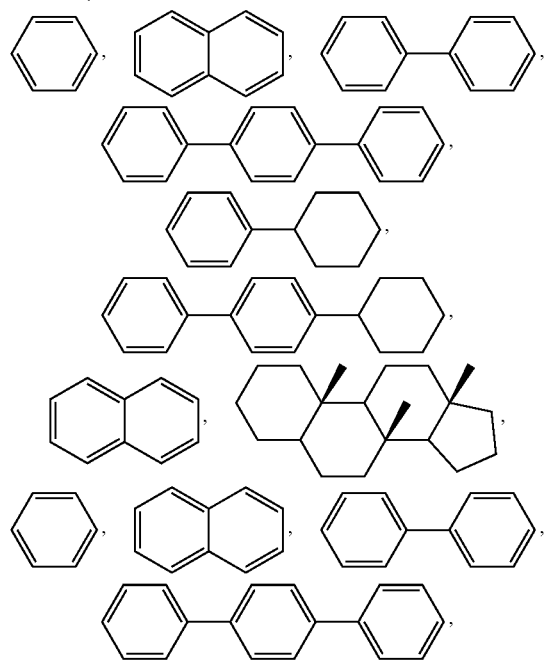
Z is any one of
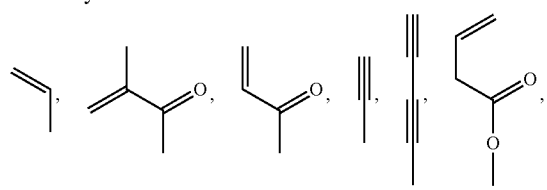
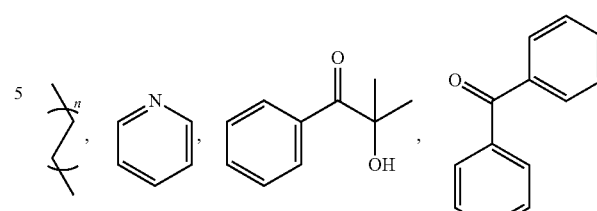
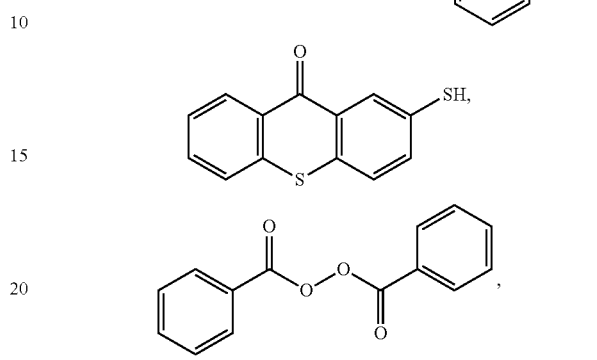
T is any of
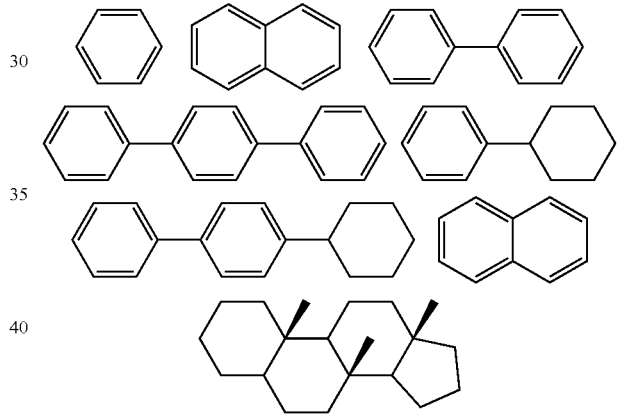
and n is 0 to 20.
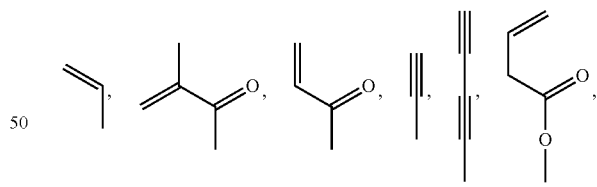
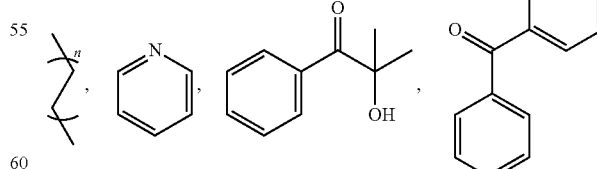
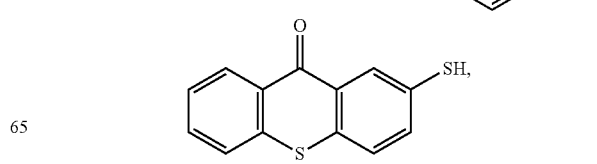

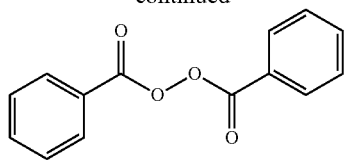 5

The alignment layer may include a compound represented by the following Chemical Formula 4 and a compound represented by the following Chemical Formula 5.

[Chemical Formula 4]

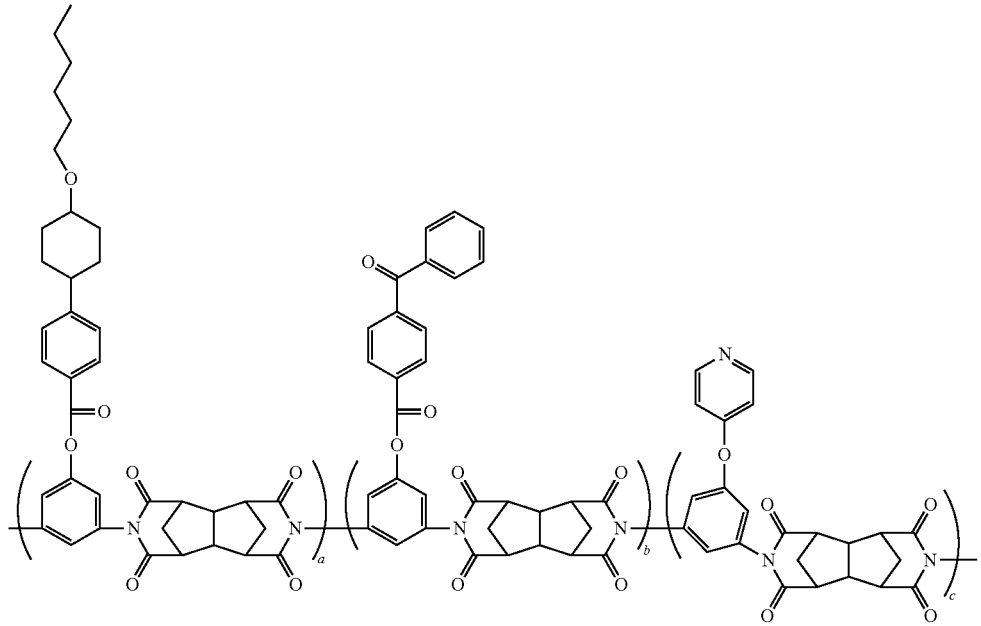

[Chemical Formula 5]

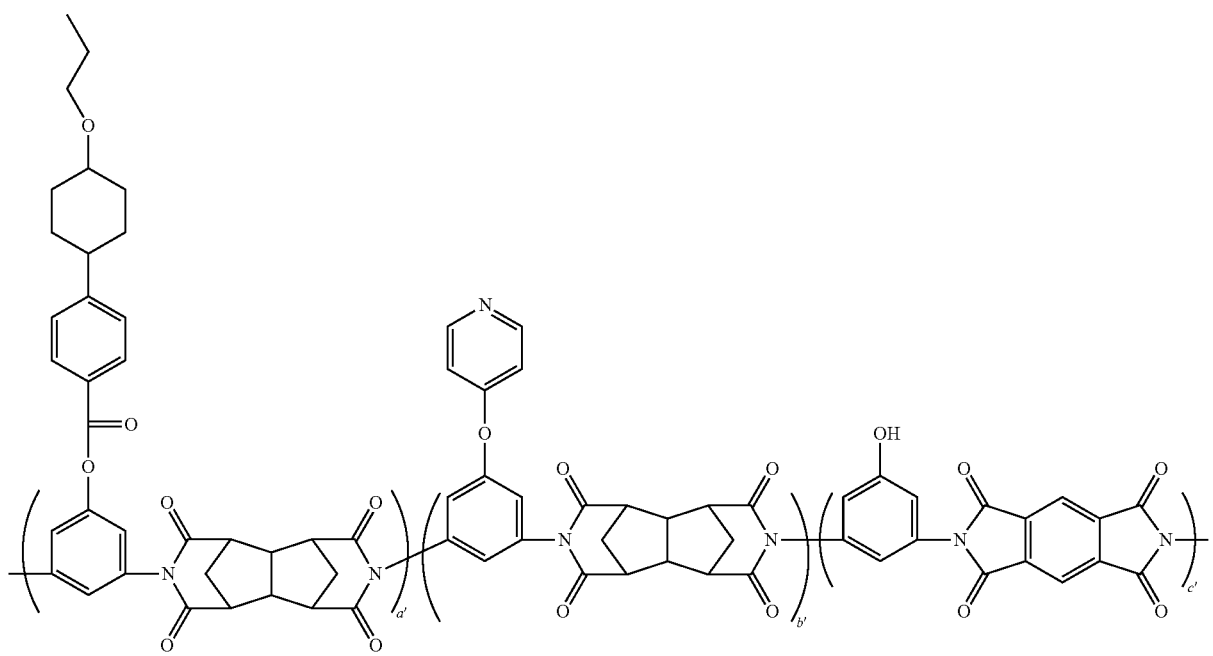

A ratio of a, b, and c of Chemical Formula 4 may be 5:3:2.
A ratio of a', b', and c' of Chemical Formula 5 may be 3:3:4.
The compounds of Chemical Formulas 4 and 5 may be mixed at a weight ratio of 7:3.

The pixel electrode may include a cross-shaped stem portion and fine branch portions extending in four diagonal directions from the cross-shaped stem portion.

Another exemplary embodiment of the present invention provides a method of manufacturing a liquid crystal display, including: preparing a lower panel where a pixel electrode is formed and an upper panel where a common electrode is formed; applying an alignment layer solution including two kinds or more of reactive mesogens as an additive on the lower panel or the upper panel, and drying the alignment layer solution; injecting a liquid crystal between the lower panel and the upper panel to form a display panel assembly; annealing the display panel assembly to elute the reactive mesogen in an alignment layer into a liquid crystal layer; and radiating ultraviolet rays on the display panel assembly to react the reactive mesogen and thus form a pretilt.

The additive may be a mixture of two or more reactive mesogens selected from the group consisting of the following Chemical Formulas 1-1 to 1-15.

[Chemical Formulas 1-1 to 1-15]

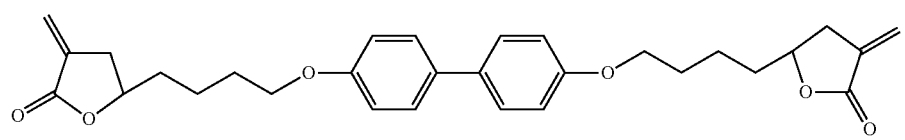

(1-1)

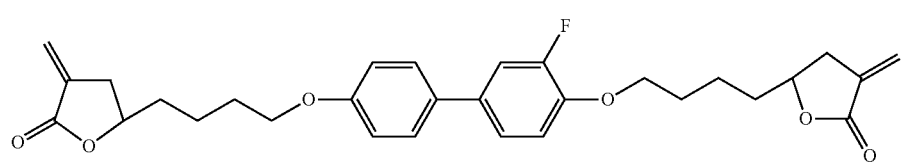

(1-2)

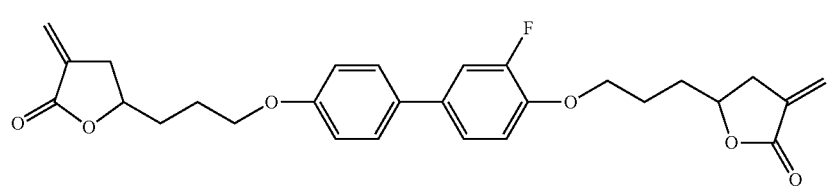

(1-3)

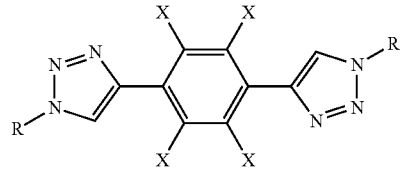

(1-4)

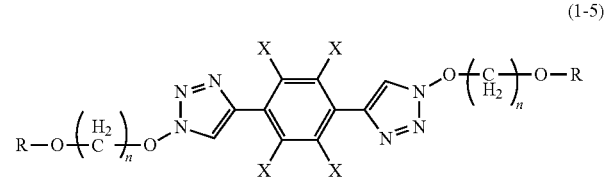

(1-5)

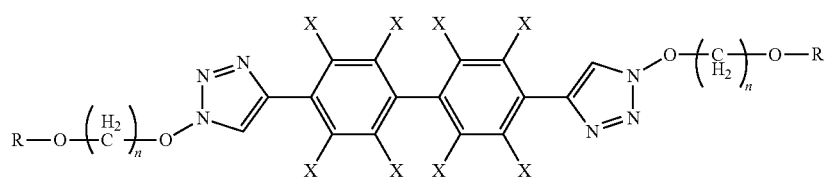

(1-6)

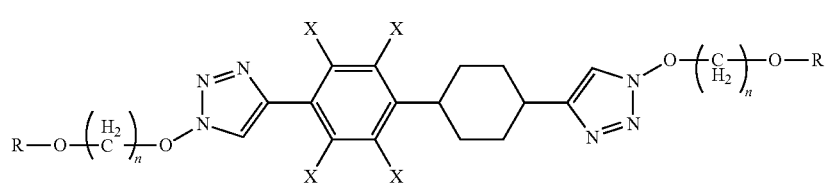

(1-7)

-continued

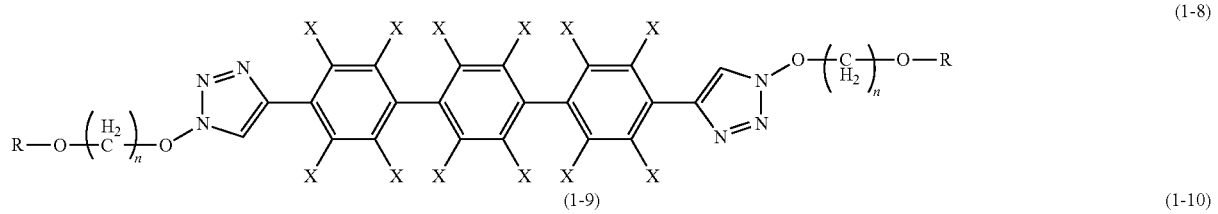
(1-8)

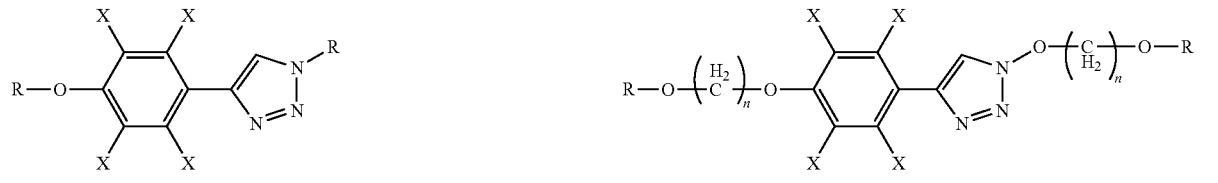
(1-9) (1-10)

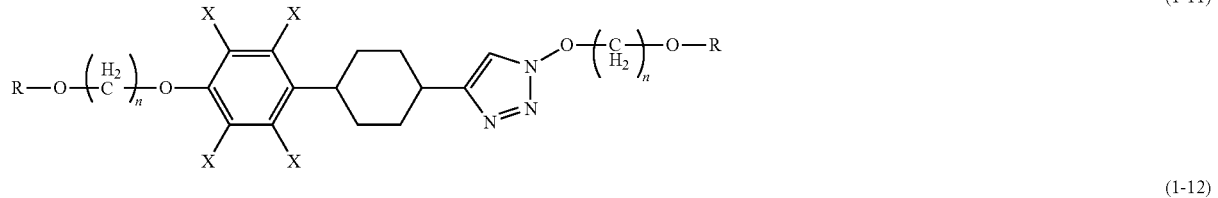
(1-11)

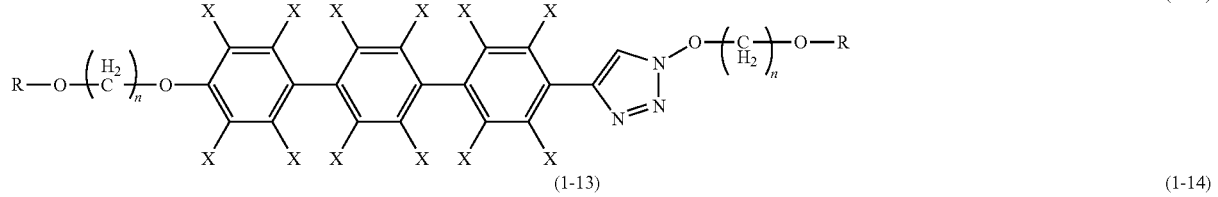
(1-12)

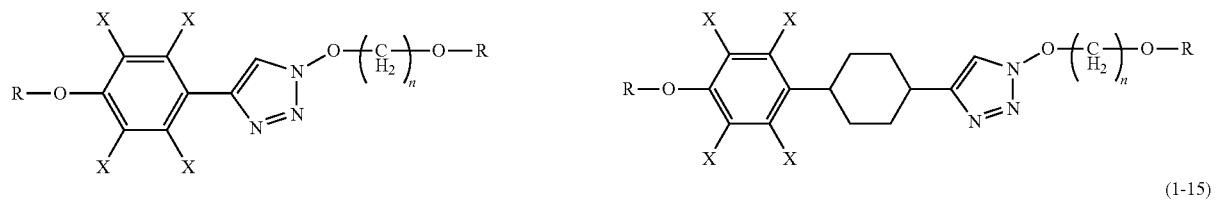
(1-13) (1-14)

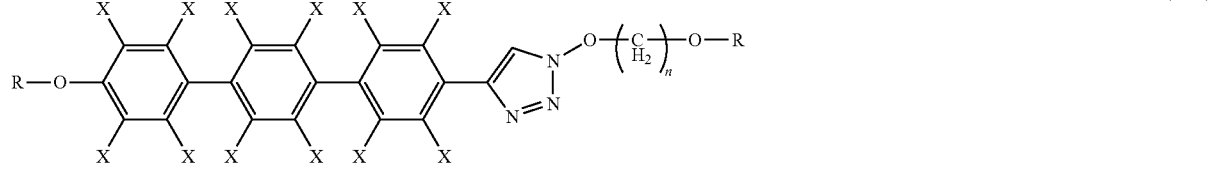
(1-15)

In Chemical Formulas 1-4 to 1-15,

X's are each independently H, $CH_3$, $(CH_2)_nCH_3$, F, Br, I, OH, $C_3H_7$, $NH_2$, or CN, R's are each independently any one of

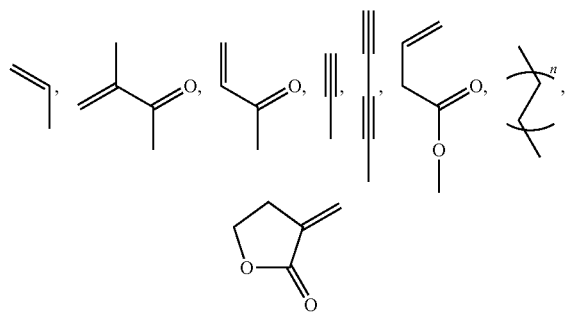

and n is 1 to 20.

The additive may be included in a content of 15 wt % to 50 wt % in the alignment layer solution.

The additive may include two compounds selected from the group consisting of compounds of Chemical Formulas 1-1 to 1-15, and each compound may be included in a content of 15 wt % or less based on the alignment layer solution.

The radiating of the ultraviolet rays on the display panel assembly to react the reactive mesogen and thus form the pretilt may be performed in a state where an electric field is applied to the display panel assembly.

The method may further include: after the radiating of the ultraviolet rays on the display panel assembly to react the reactive mesogen and thus form the pretilt, additionally radiating the ultraviolet rays to remove an unreacted residual reactive mesogen.

The alignment layer solution may include a compound represented by the following Chemical Formula 2.

(Chemical Formula 2)
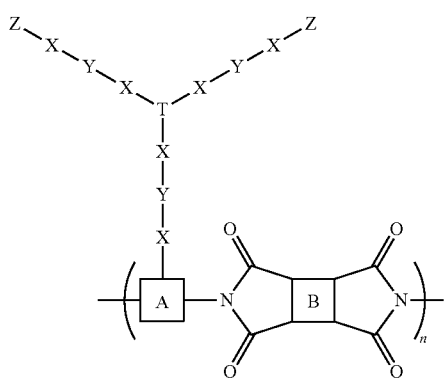
In Chemical Formula 2,
A is any one of
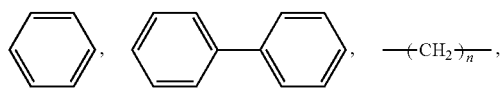
B is any one of
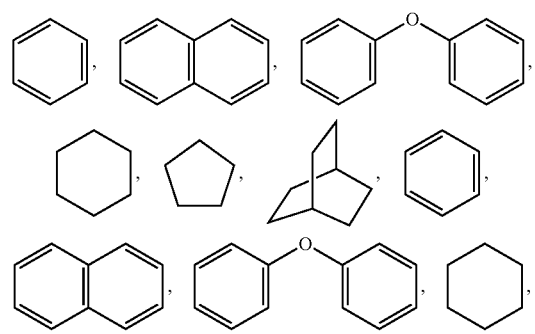
-continued
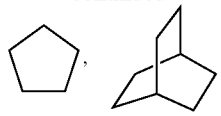
X is any one of
Y is any one of
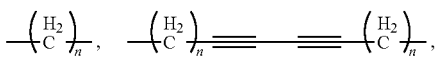
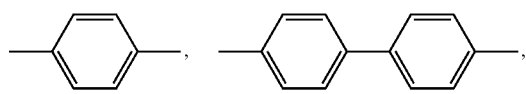
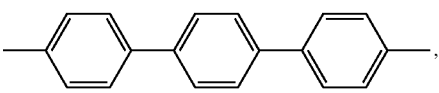
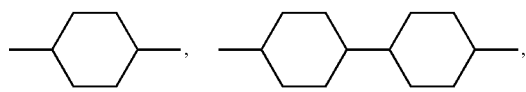
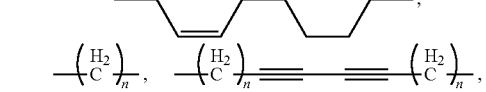
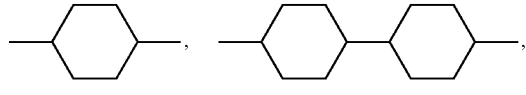
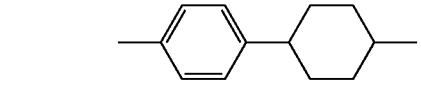
N is any one of
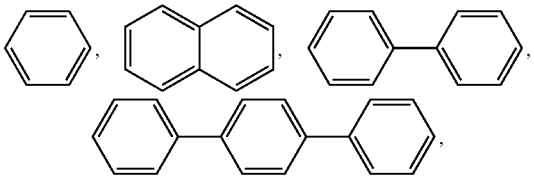

-continued
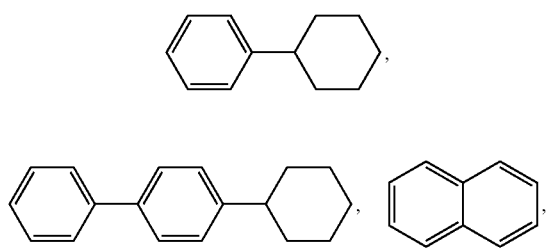
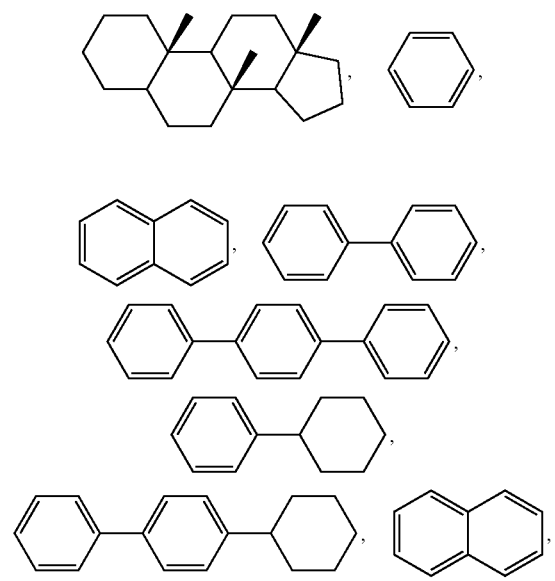
Z is any one of
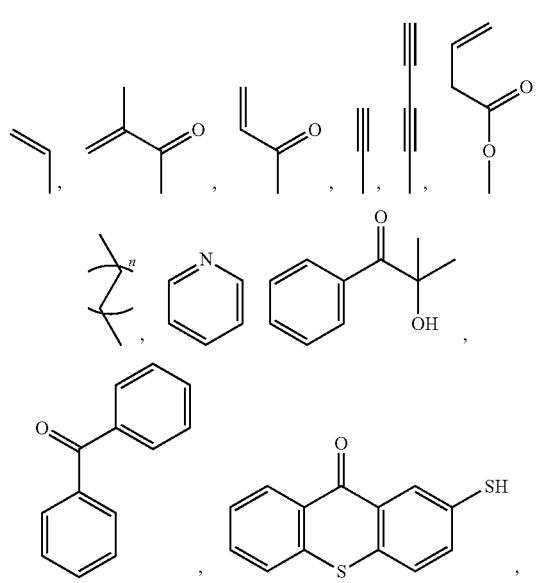
-continued
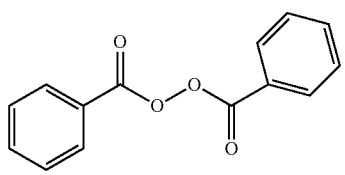
T is any of
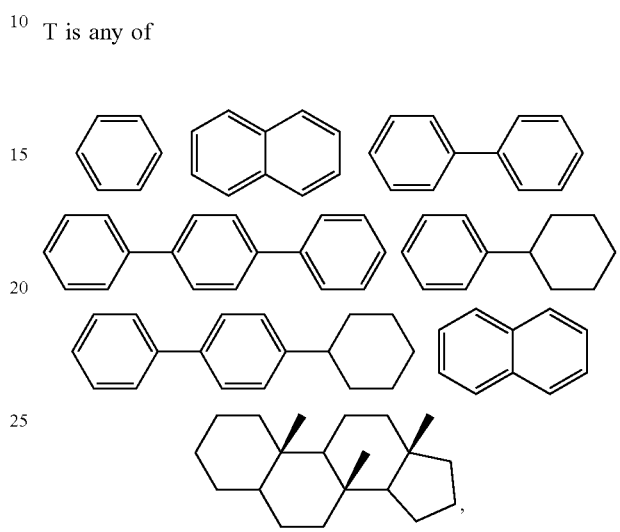
and n is 0 to 20.
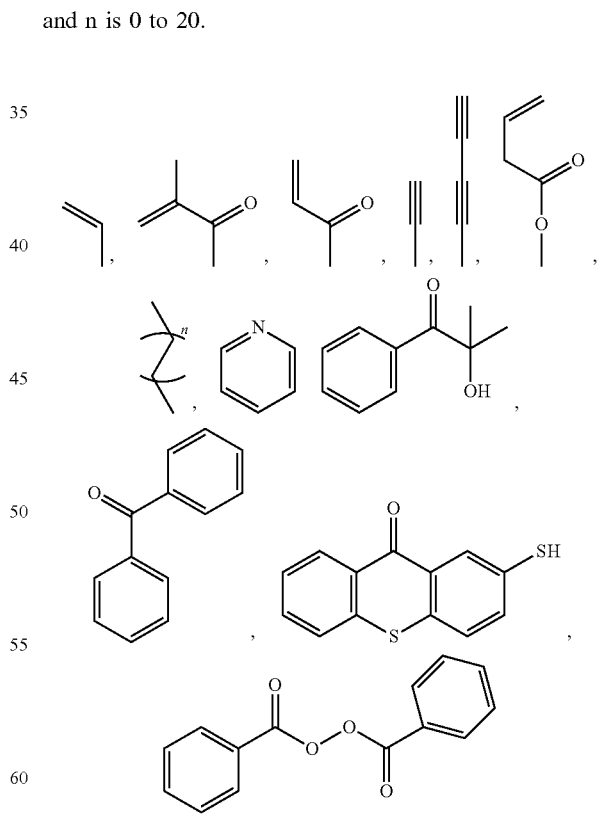
The alignment layer solution may include a compound represented by the following Chemical Formula 4 and a compound represented by the following Chemical Formula 5.

[Chemical Formula 4]

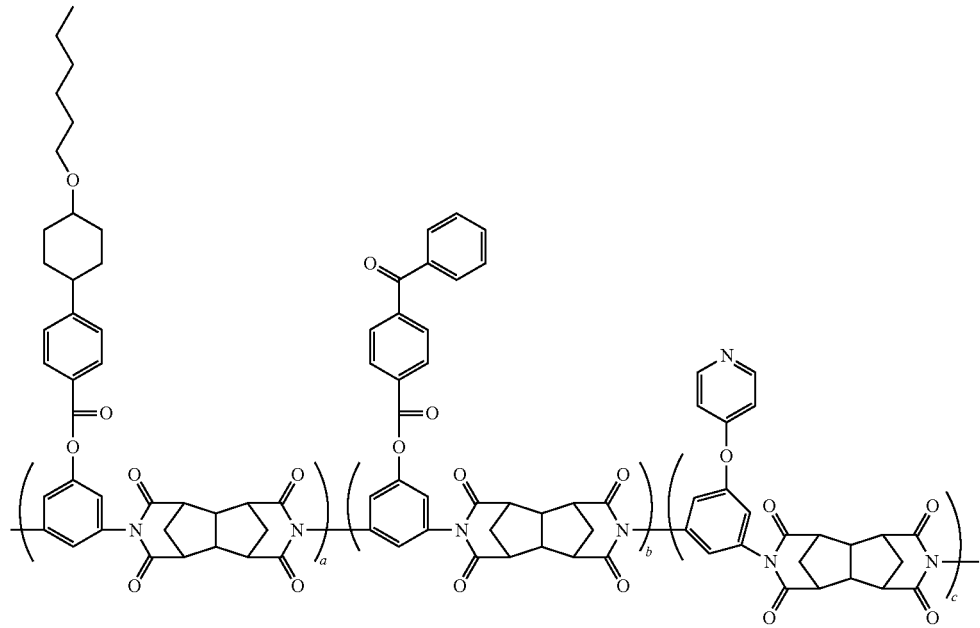

[Chemical Formula 5]

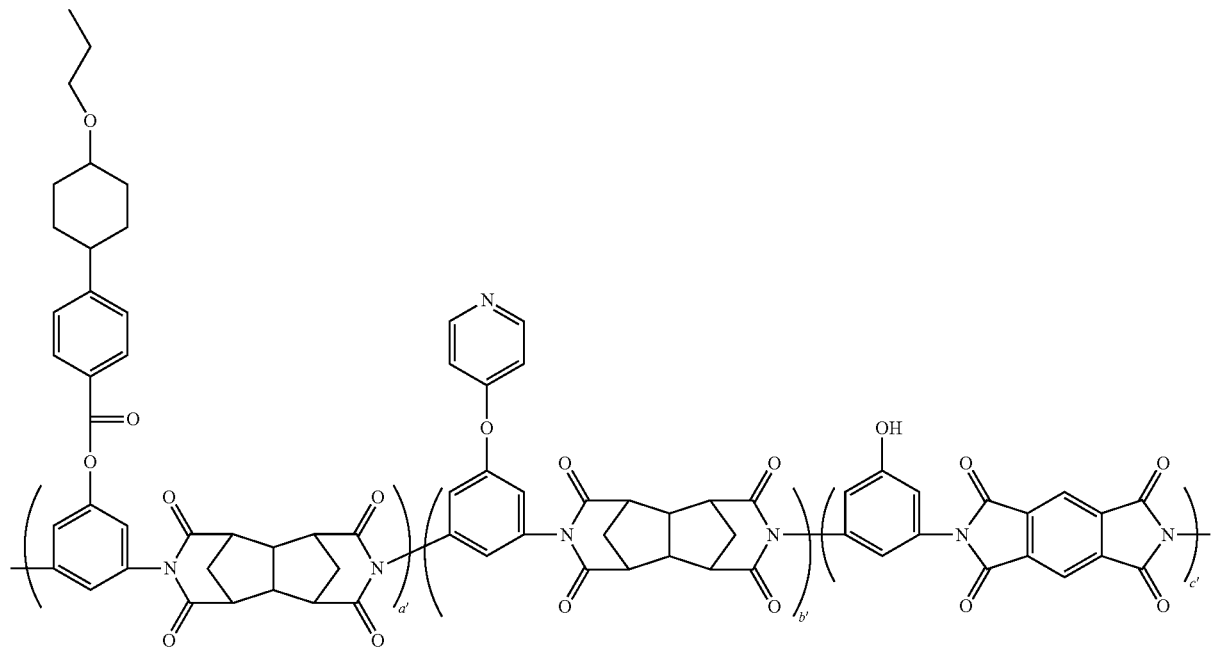

A ratio of a, b, and c of Chemical Formula 4 may be 5:3:2, and a ratio of a', b', and c' of Chemical Formula 5 may be 3:3:4.

The compounds of Chemical Formulas 4 and 5 may be mixed at a weight ratio of 7:3.

As described above, in a liquid crystal display of the present invention and a method of manufacturing the same, two kinds or more of reactive mesogens are added in an additive form to an alignment layer to improve a characteristic of the alignment layer and improve an afterimage of the liquid crystal display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
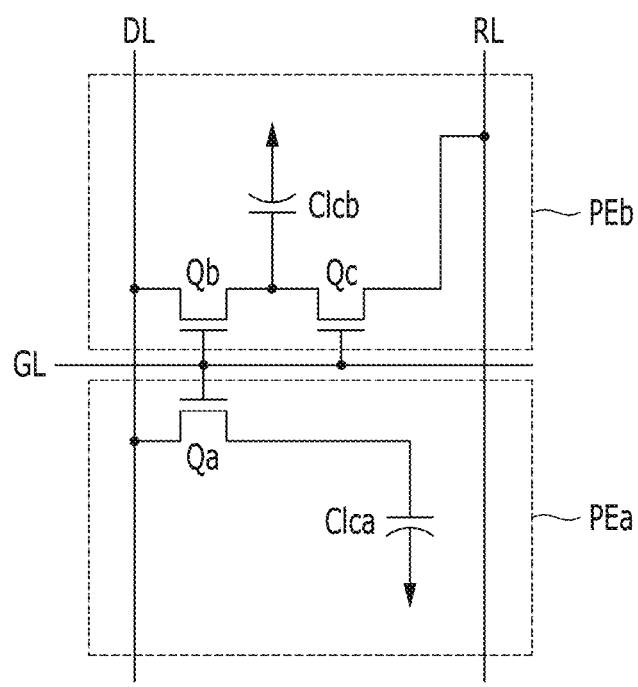
FIG. 1 is an equivalent circuit diagram for one pixel of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention and a method of manufacturing the liquid crystal display will be described in detail with reference to the drawings.

First, the liquid crystal display of the present invention will be described. The liquid crystal display of the present invention includes a first insulation substrate, a second insulation substrate facing the first insulation substrate, a pixel electrode positioned in the first insulation substrate, a common electrode positioned on the first insulation substrate or the second insulation substrate, a first alignment layer positioned on the first insulation substrate, a second alignment layer positioned on the second insulation substrate, and a liquid crystal layer positioned between the first insulation substrate and the second insulation substrate, the first alignment layer and the second alignment layer include an additive, and the additive is a mixture of two or more reactive mesogens selected from the group consisting of the following Chemical Formulas 1-1 to 1-15.

[Chemical Formulas 1-1 to 1-15]

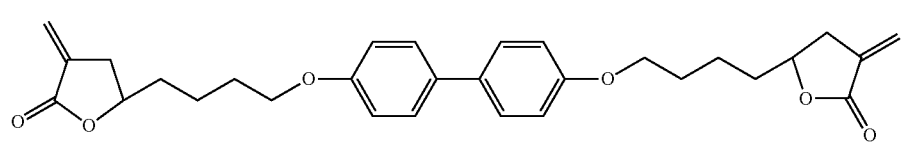

(1-1)

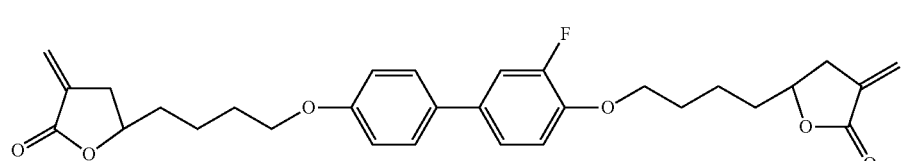

(1-2)

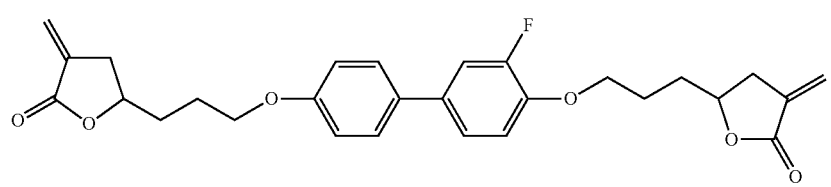

(1-3)

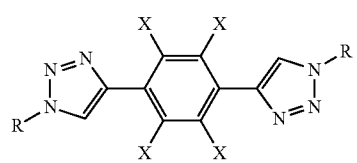

(1-4)

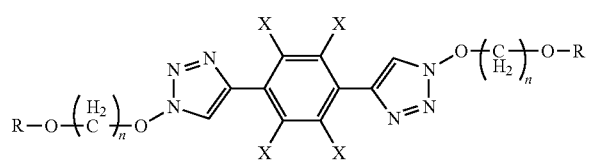

(1-5)

(1-6)
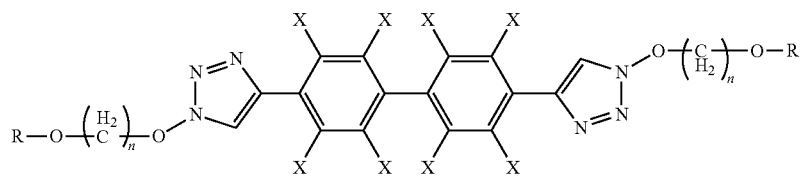
(1-7)
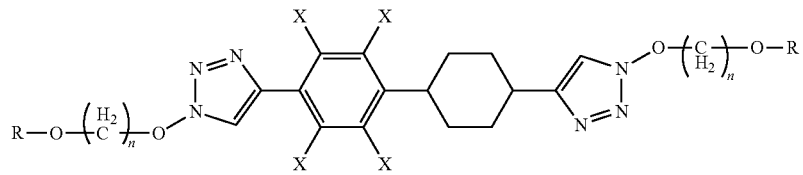
(1-8)
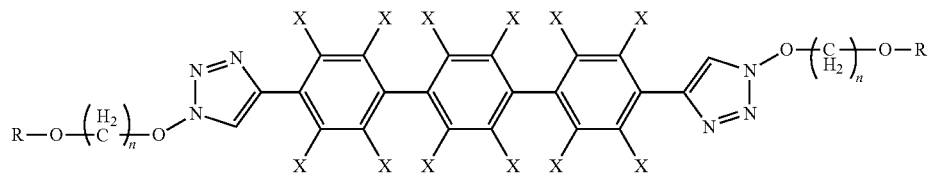
(1-9)
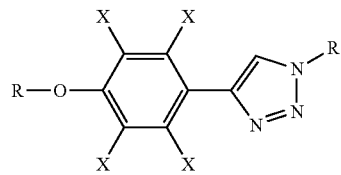
(1-10)
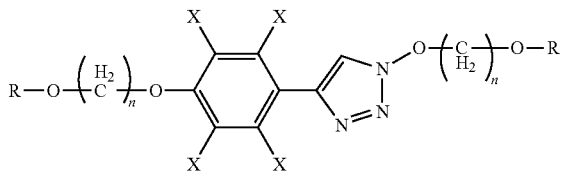
(1-11)
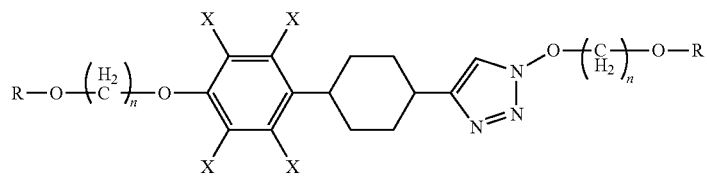
(1-12)
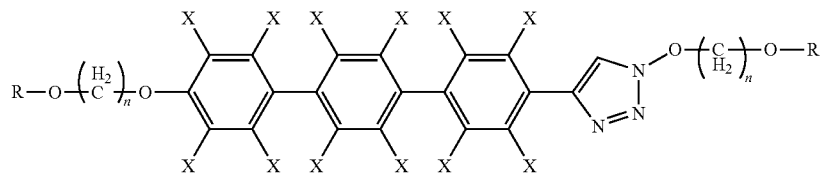
(1-13)
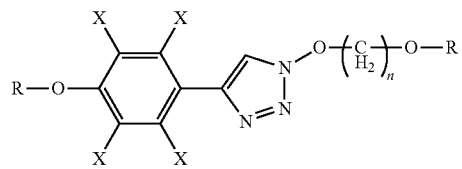
(1-14)
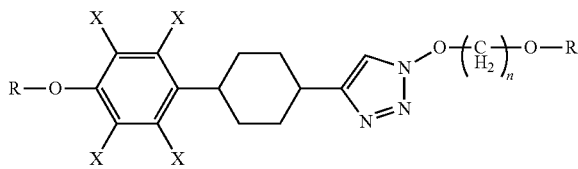
(1-15)
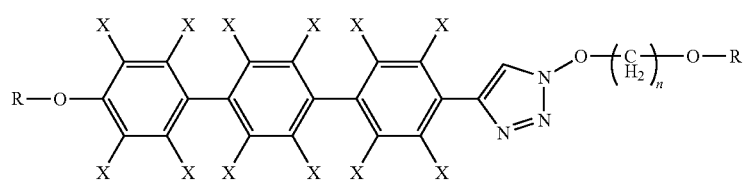

In Chemical Formulas 1-4 to 1-15, X's are each independently H, CH$_3$, (CH$_2$)$_n$CH$_3$, F, Br, I, OH, C$_3$H$_7$, NH$_2$, or CN, R's are each independently any one of

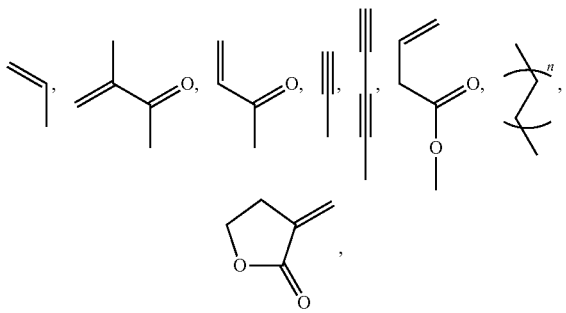

and n is 1 to 20.

First, disposal of a signal line and a pixel of the liquid crystal display of the present invention, and a driving method thereof will be described with reference to FIG. 1. FIG. 1 is an equivalent circuit diagram for one pixel of the liquid crystal display according to the exemplary embodiment of the present invention.

Referring to FIG. 1, one pixel PX of the liquid crystal display according to the present exemplary embodiment includes a plurality of signal lines including a gate line GL transferring a gate signal, a data line DL transferring a data signal, and a divided voltage reference voltage line RL transferring a divided voltage reference voltage, and first, second, and third switching elements Qa, Qb, and Qc, and first and second liquid crystal capacitors Clca and Clcb connected to the plurality of signal lines.

The first and second switching elements Qa and Qb are connected to the gate line GL and the data line DL, respectively, and the third switching element Qc is connected to an output terminal of the second switching element Qb and the divided voltage reference voltage line RL.

The first switching element Qa and the second switching element Qb are a three terminal element such as a thin film transistor, a control terminal thereof is connected to the gate line GL, an input terminal thereof is connected to the data line DL, an output terminal of the first switching element Qa is connected to the first liquid crystal capacitor Clca, and the output terminal of the second switching element Qb is connected to the second liquid crystal capacitor Clcb and an input terminal of the third switching element Qc.

The third switching element Qc is also the three terminal element such as the thin film transistor, a control terminal thereof is connected to the gate line GL, the input terminal thereof is connected to the second liquid crystal capacitor Clcb, and an output terminal thereof is connected to the divided voltage reference voltage line RL.

If a gate on signal is applied to the gate line GL, the first switching element Qa, the second switching element Qb, and the third switching element Qc connected thereto are turned on. Accordingly, the data voltage applied to the data line DL is applied to a first sub-pixel electrode PEa and a second sub-pixel electrode PEb through the first switching element Qa and the second switching element Qb that are turned on. In this case, the data voltages applied to the first sub-pixel electrode PEa and the second sub-pixel electrode PEb are the same as each other, and the first liquid crystal capacitor Clca and the second liquid crystal capacitor Clcb are charged in the same value by a difference between the common voltage and the data voltage. Simultaneously, the voltage charged in the second liquid crystal capacitor Clcb is divided through the turned-on third switching element Qc. Thereby, a value of the voltage charged in the second liquid crystal capacitor Clcb is reduced by a difference between the common voltage and the divided voltage reference voltage. That is, the voltage charged in the first liquid crystal capacitor Clca is higher than the voltage charged in the second liquid crystal capacitor Clcb.

Like this, the voltage charged in the first liquid crystal capacitor Clca and the voltage charged in the second liquid crystal capacitor Clcb are different from each other. Since the voltage of the first liquid crystal capacitor Clca and the voltage of the second liquid crystal capacitor Clcb are different from each other, inclination angles of liquid crystal molecules in a first sub-pixel and a second sub-pixel are different from each other, and thus luminances of the two sub-pixels are different from each other. Accordingly, if the voltage of the first liquid crystal capacitor Clca and the voltage of the second liquid crystal capacitor Clcb are appropriately adjusted, an image viewed from a lateral surface may approach an image viewed from a front surface as closely as possible, and thus lateral surface visibility may be improved.

In the illustrated exemplary embodiment, in order to make the voltage charged in the first liquid crystal capacitor Clca and the voltage charged in the second liquid crystal capacitor Clcb different, the third switching element Qc connected to the second liquid crystal capacitor Clcb and the divided voltage reference voltage line RL is included, but in the case of the liquid crystal display according to another exemplary embodiment of the present invention, the second liquid crystal capacitor Clcb may be connected to a step-down capacitor. Specifically, the third switching element including a first terminal connected to a step-down gate line, a second terminal connected to the second liquid crystal capacitor Clcb, and a third terminal connected to the step-down capacitor may be included to charge a portion of an amount of electric charges charged in the second liquid crystal capacitor Clcb in the step-down capacitor and thus charge voltages between the first liquid crystal capacitor Clca and the second liquid crystal capacitor Clcb may be set to be different from each other. Further, in the case of the liquid crystal display according to another exemplary embodiment of the present invention, a first liquid crystal capacitor Clca and a second liquid crystal capacitor Clcb may be connected to different data lines to receive different data voltages and thus charge voltages between the first liquid crystal capacitor Clca and the second liquid crystal capacitor Clcb may be set to be different from each other. In addition, the charge voltages between the first liquid crystal capacitor Clca and the second liquid crystal capacitor Clcb may be set to be different from each other by various other methods.

Then, disposal of a first substrate and a second substrate of the liquid crystal display of the present invention will be described with reference to FIGS. 2 to 4.

Figure 2:
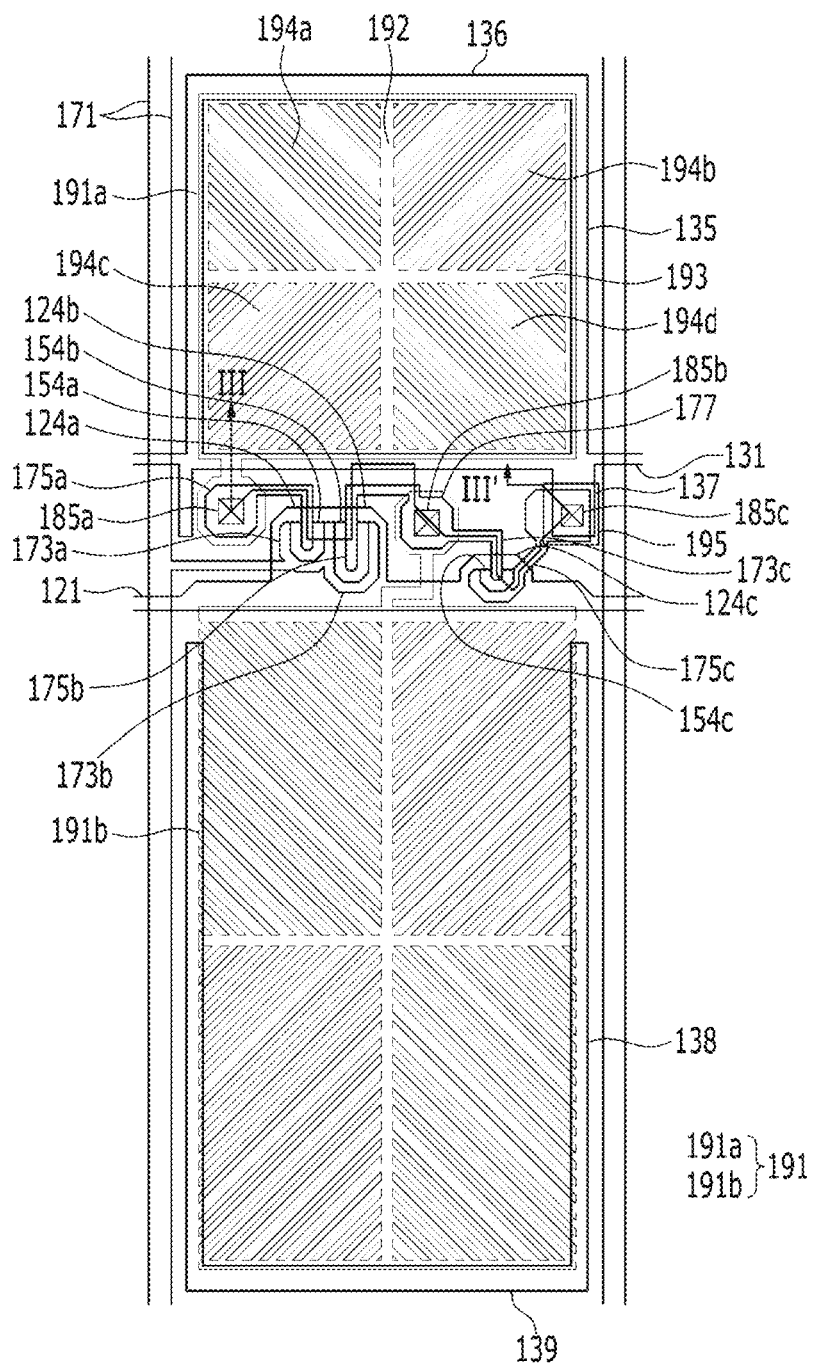
FIG. 2 is a layout view of the liquid crystal display according to the exemplary embodiment of the present invention.
Figure 3:
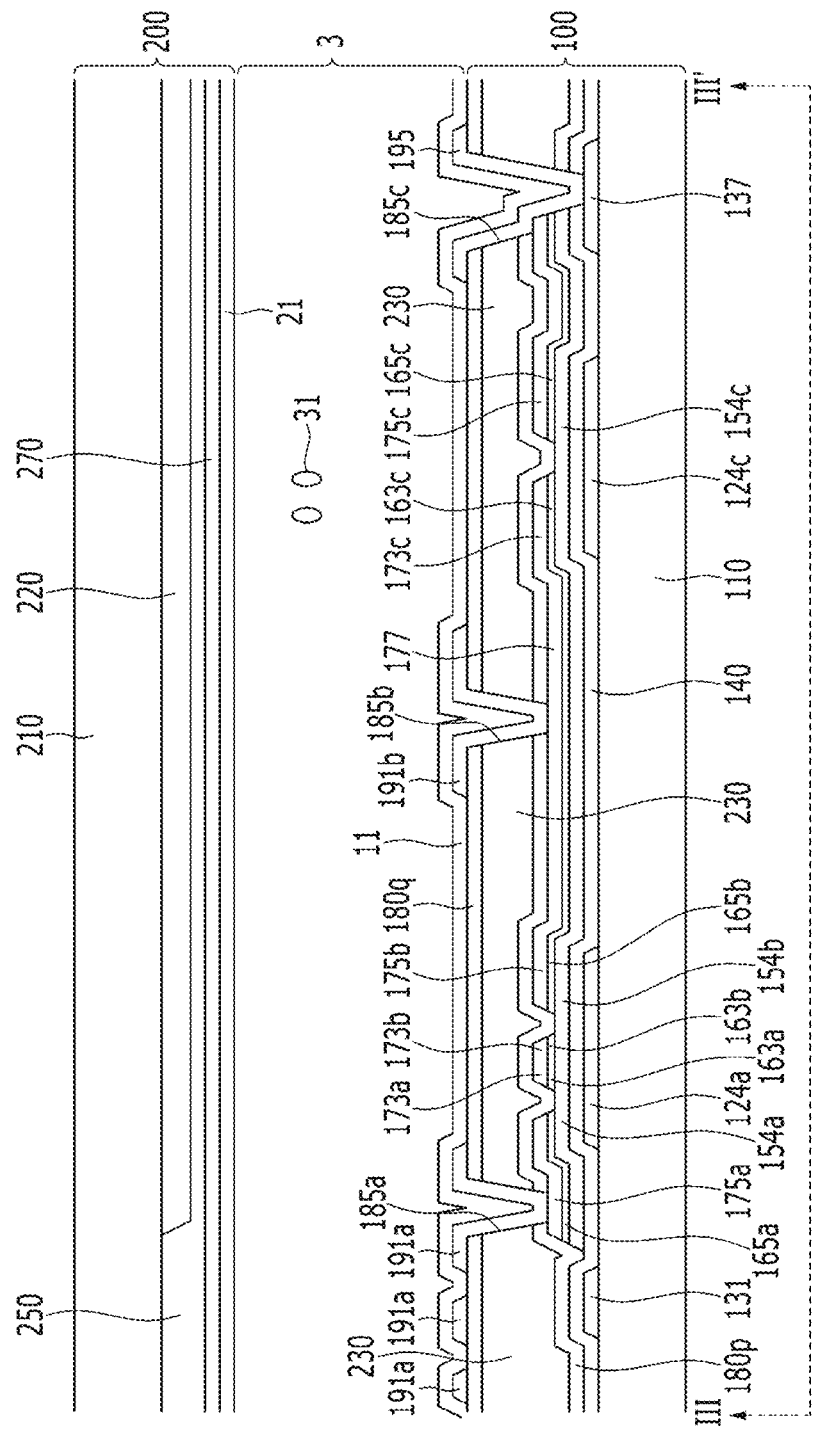
FIG. 3 is a cross-sectional view taken along line IV-IV of the liquid crystal display of FIG. 2.

FIG. 2 is a layout view of the liquid crystal display according to the exemplary embodiment of the present invention, and FIG. 3 is a cross-sectional view taken along line IV-IV of the liquid crystal display of FIG. 2. FIG. 4 is a top plan view illustrating a basic region of a pixel electrode of a lower panel according to the exemplary embodiment of the present invention.

First, the lower panel 100 will be described.

A gate conductor including a gate line 121 and a divided voltage reference voltage line 131 is formed on an insulation substrate 110 made of transparent glass, plastics, or the like.

The gate line 121 includes a first gate electrode 124a, a second gate electrode 124b, a third gate electrode 124c, and a wide end portion (not illustrated) for connection to another layer or an external driving circuit.

The divided voltage reference voltage line 131 includes first storage electrodes 135 and 136 and a reference electrode 137. Second storage electrodes 138 and 139 that are not connected to the divided voltage reference voltage line 131 but overlap with a second sub-pixel electrode 191b are positioned.

A gate insulating layer 140 is formed on the gate line 121 and the divided voltage reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a plurality of data lines 171 including a first source electrode 173a and a second source electrode 173b, a first drain electrode 175a, a second drain electrode 175b, a third source electrode 173a, and a third drain electrode 175c is formed on the ohmic contacts 163a, 165a, 163b, 165b, 163c, and 165c and the gate insulating layer 140.

The data conductor, and the semiconductors and the ohmic contacts positioned therebeneath may be formed simultaneously by using one mask.

The data line 171 includes a wide end portion (not illustrated) for connection to another layer or an external driving circuit.

The first gate electrode 124a, the first source electrode 173a, and the first drain electrode 175a form one first thin film transistor (TFT) Qa together with a first semiconductor island 154a, and a channel of the thin film transistor is formed in the semiconductor 154a between the first source electrode 173a and the first drain electrode 175a. Similarly, the second gate electrode 124b, the second source electrode 173b, and the second drain electrode 175b form one second thin film transistor Qb together with a second semiconductor island 154b, a channel is formed in the semiconductor 154b between the second source electrode 173b and the second drain electrode 175b, the third gate electrode 124c, the third source electrode 173c, and the third drain electrode 175c form one third thin film transistor Qc together with a third semiconductor island 154c, and a channel is formed in the semiconductor 154c between the third source electrode 173c and the third drain electrode 175c.

The second drain electrode 175b includes an expanded portion 177 connected to the third source electrode 173c and widely expanded.

A first passivation layer 180p is formed on the data conductors 171, 173c, 175a, 175b, and 175c and the exposed portion of the semiconductors 154a, 154b, and 154c. The first passivation layer 180p may include an inorganic insulating layer such as silicon nitride or silicon oxide. The first passivation layer 180p may prevent a pigment of a color filter 230 from flowing into the exposed portion of the semiconductors 154a, 154b, and 154c.

The color filter 230 is formed on the first passivation layer 180p. The color filter 230 extends in a vertical direction along two adjacent data lines. A first light blocking member 220 is positioned on the first passivation layer 180p, an edge of the color filter 230, and the data line 171.

However, the color filter 230 may not be formed in the lower panel 100 but may be formed in an upper panel 200.

A second passivation layer 180q is formed on the color filter 230.

The second passivation layer 180q may include an inorganic insulating layer such as silicon nitride or silicon oxide. The second passivation layer 180q prevents peeling of the color filter 230, and suppresses contamination of the liquid crystal layer 3 by an organic material such as a solvent flowing from the color filter 230 to prevent defects such as afterimages that may occur when an image is driven.

A first contact hole 185a and a second contact hole 185b through which the first drain electrode 175a and the second drain electrode 175b are exposed are formed in the first passivation layer 180p and the second passivation layer 180q.

A third contact hole 185c through which a portion of the reference electrode 137 and a portion of the third drain electrode 175c are exposed is formed in the first passivation layer 180p, the second passivation layer 180q, and the gate insulating layer 140, and the third contact hole 185c is covered by a connecting member 195. The connecting member 195 electrically connects the reference electrode 137 and the third drain electrode 175c exposed through the third contact hole 185c.

A plurality of pixel electrodes 191 are formed on the second passivation layer 180q. The pixel electrodes 191 are separated from each other while the gate line 121 is interposed therebetween, and each of the pixel electrodes 191 includes the first sub-pixel electrode 191a and the second sub-pixel electrode 191b adjacent in a column direction based on the gate line 121. The pixel electrode 191 may be formed of a transparent material such as ITO and IZO. The pixel electrode 191 may be made of a transparent conductive material such as ITO or IZO, or a reflective metal such as aluminum, silver, chromium, or an alloy thereof.

The first sub-pixel electrode 191a and the second sub-pixel electrode 191b each include a basic electrode illustrated in FIG. 2 or one or more modifications thereof.

The first sub-pixel electrode 191a and the second sub-pixel electrode 191b are physically and electrically connected through the first contact hole 185a and the second contact hole 185b to the first drain electrode 175a and the second drain electrode 175b, respectively, and receive a data voltage from the first drain electrode 175a and the second drain electrode 175b. In this case, a portion of the data voltage applied to the second drain electrode 175b is divided through the third source electrode 173c, and thus a magnitude of a voltage applied to the first sub-pixel electrode 191a is larger than a magnitude of a voltage applied to the second sub-pixel electrode 191b.

The first sub-pixel electrode 191a and the second sub-pixel electrode 191b to which the data voltage is applied generate an electric field together with the common electrode 270 of the upper panel 200 to determine a direction of the liquid crystal molecules of the liquid crystal layer 3 between two electrodes 191 and 270. The luminance of light passing through the liquid crystal layer 3 is changed according to the thus determined direction of the liquid crystal molecules.

A lower alignment layer 11 is applied on the pixel electrode 191. The lower alignment layer 11 may include a reactive mesogen in an additive form. The alignment layer will be described below.

Then, a basic electrode 199 of the lower panel will be described with reference to FIG. 4.

Figure 4:
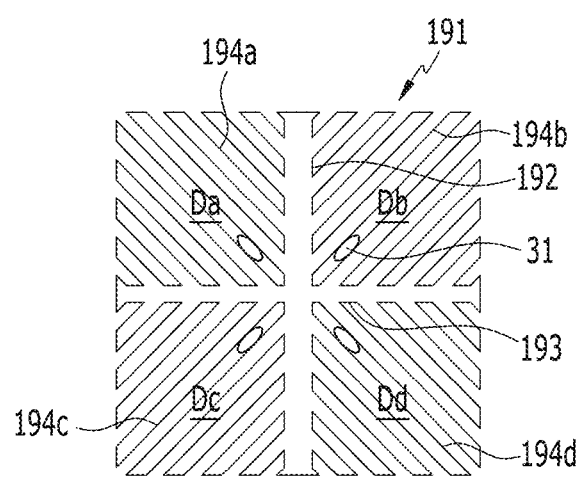
FIG. 4 is a top plan view illustrating a basic region of a pixel electrode of a lower panel according to the exemplary embodiment of the present invention.
Figure 5A:
FIGS. 5A to 5D illustrate light leakage defect according to content of a reactive mesogen.
Figure 5B:
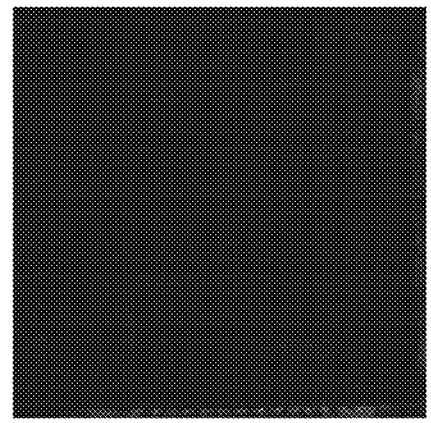
Figure 5C:
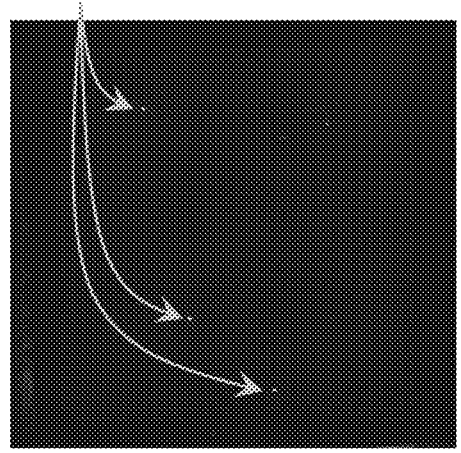
Figure 5D:
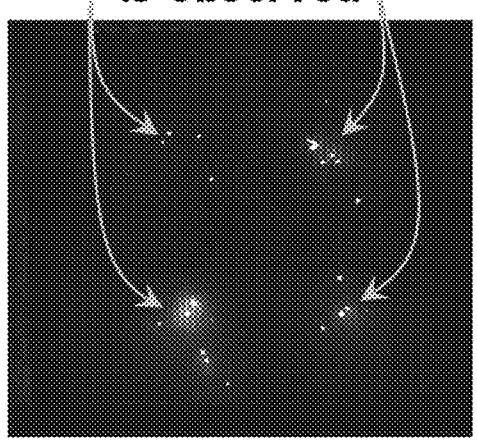

As illustrated in FIG. 4, the entire shape of the basic electrode 199 is quadrangle, and the basic electrode includes a cross-shaped stem portion formed of a horizontal stem portion 193 and a vertical stem portion 192 that is vertical thereto. Further, the basic electrode 199 is divided into a first sub-region Da, a second sub-region Db, a third sub-region Dc, and a fourth sub-region Dd by the horizontal stem portion 193 and the vertical stem portion 192, and each of the sub-regions Da to Dd includes a plurality of first fine branch portions 194a, a plurality of second fine branch portions 194b, a plurality of third fine branch portions 194c, and a plurality of fourth fine branch portions 194d.

The first fine branch portion 194a extends obliquely in an upper left direction from the horizontal stem portion 193 or the vertical stem portion 192, and the second fine branch portion 194b extends obliquely in an upper right direction from the horizontal stem portion 193 or the vertical stem portion 192. Further, the third fine branch portion 194c extends in a lower left direction from the horizontal stem portion 193 or the vertical stem portion 192, and the fourth fine branch portion 194d extends obliquely in a lower right direction from the horizontal stem portion 193 or the vertical stem portion 192.

The first to fourth fine branch portions 194a, 194b, 194c, and 194d form an angle of about 45° or 135° to the gate lines 121a and 121b or the horizontal stem portion 193. Further, the fine branch portions 194a, 194b, 194c, and 194d of the two adjacent sub-regions Da, Db, Dc, and Dd may be orthogonal to each other.

Widths of the fine branch portions 194a, 194b, 194c, and 194d may be 2.5 µm to 5.0 µm and a gap between the adjacent fine branch portions 194a, 194b, 194c, and 194d in one sub-region Da, Db, Dc, or Dd may be 2.5 µm to 5.0 µm.

According to another exemplary embodiment of the present invention, the widths of the fine branch portions 194a, 194b, 194c, and 194d may be increased as the fine branch portions become closer to the horizontal stem portion 193 or the vertical stem portion 192, and a difference between the largest width portion and the smallest width portion in one fine branch portion 194a, 194b, 194c, or 194d may be 0.2 µm to 1.5 µm.

The first sub-pixel electrode 191a and the second sub-pixel electrode 191b are connected through the first contact hole 185a and the second contact hole 185b to the first drain electrode 175a or the second drain electrode 175b, and receive a data voltage from the first drain electrode 175a and the second drain electrode 175b. In this case, sides of the first to fourth fine branch portions 194a, 194b, 194c, and 194d distort an electric field to generate a horizontal component determining an inclination direction of liquid crystal molecules 31. The horizontal components of the electric field are almost horizontal to the sides of the first to fourth fine branch portions 194a, 194b, 194c, and 194d. Therefore, as illustrated in FIG. 4, the liquid crystal molecules 31 are inclined in a direction that is parallel to length directions of the fine branch portions 194a, 194b, 194c, and 194d. Since one pixel electrode 191 includes four sub-regions Da to Dd in which length directions of the fine branched portions 194a, 194b, 194c, and 194d are different from each other, the directions where the liquid crystal molecules 31 are inclined are about four directions, and four domains where the alignment directions of the liquid crystal molecules 31 are different from each other are formed in the liquid crystal layer 3. As described above, if the inclination directions of the liquid crystal molecules are diversified, a reference viewing angle of the liquid crystal display is increased.

Next, the upper panel 200 will be described.

Referring to FIGS. 2 and 3, a black matrix 220 is formed on an insulation substrate 210. The black matrix is formed in the upper panel 200 to correspond to a region where the data line of the lower panel 100 is formed and a region where a transistor and the like are formed.

An overcoat 250 is formed on the black matrix. The overcoat 250 may be omitted.

A common electrode 270 is formed on the overcoat 250. An upper alignment layer 21 is applied on the common electrode 270. The upper alignment layer 21 may include a reactive mesogen in an additive form.

The lower alignment layer 11 and the upper alignment layer 21 include a polymer material including a main chain and a side chain constituting the alignment layer, and two or more reactive mesogen additives.

The additive is a mixture of two or more reactive mesogens selected from the group consisting of the following Chemical Formulas 1-1 to 1-15.

[Chemical Formulas 1-1 to 1-15]

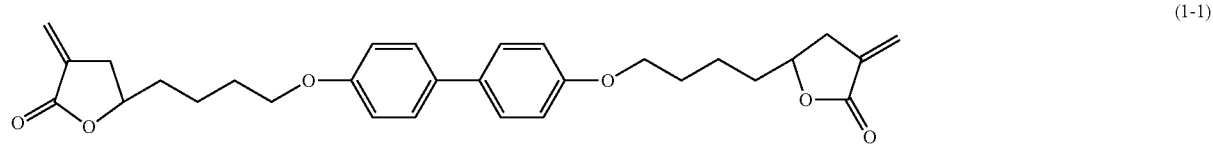

(1-1)

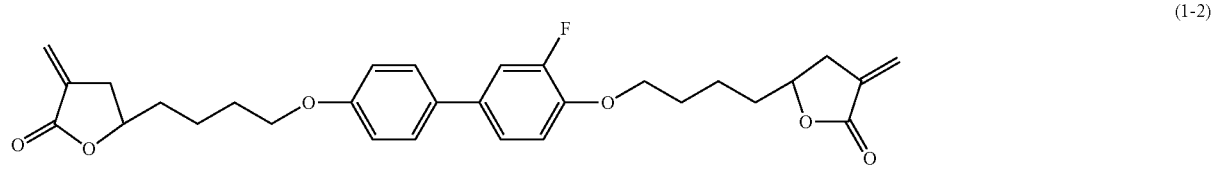

(1-2)

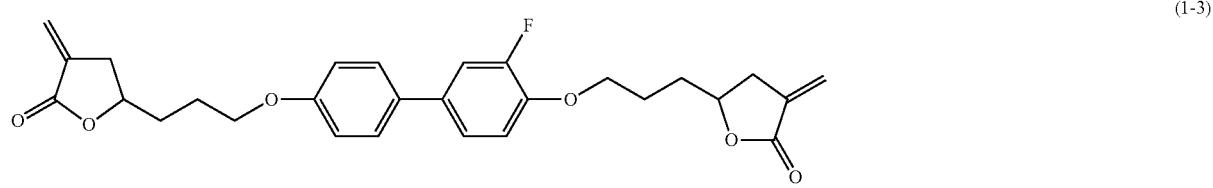

(1-3)

-continued
(1-4)
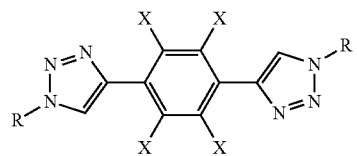
(1-5)
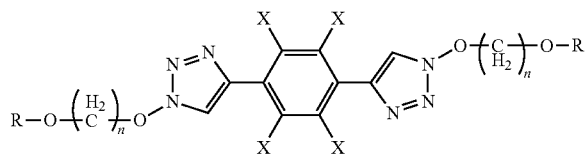
(1-6)
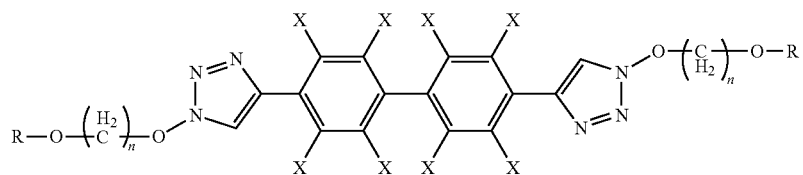
(1-7)
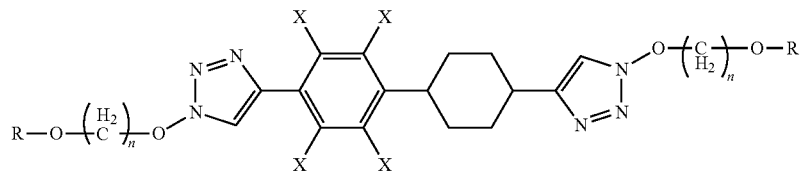
(1-8)
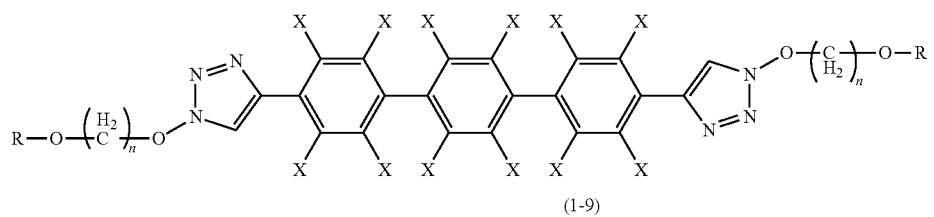
(1-9)
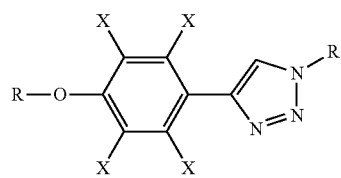
(1-10)
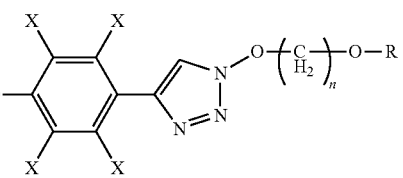
(1-11)
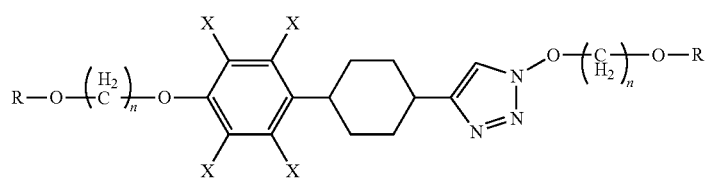
(1-12)
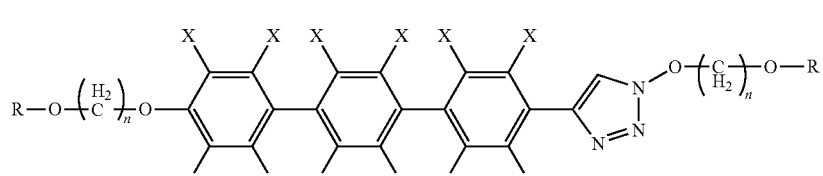
(1-13)
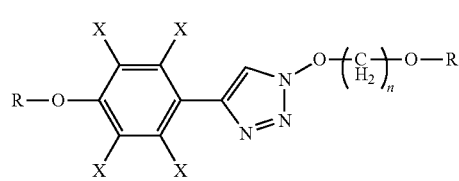
(1-14)
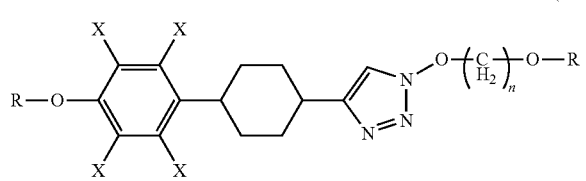

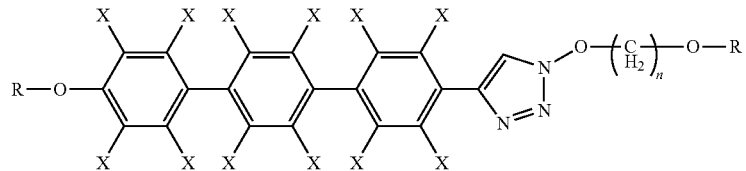

(1-15)

In Chemical Formulas 1-4 to 1-15, X's are each independently H, $CH_3$, $(CH_2)_n CH_3$, F, Br, I, OH, $C_3H_7$, $NH_2$, or CN, R's are each independently any one of

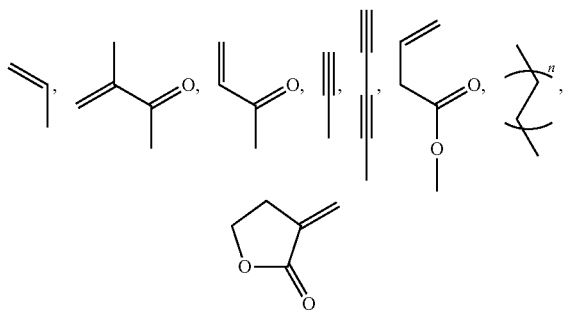

and n is 1 to 20.

In the case where the reactive mesogen is added to the alignment layer in an additive form, as an addition amount of the reactive mesogen is increased, an afterimage and reliability are improved. Therefore, it is important to increase the content of the reactive mesogen, but solubility of the reactive mesogen is low, and thus light leakage occurs due to precipitation.

That is, in the case where the reactive mesogen is included in a content of 15 wt % or more, generally, light leakage occurs due to precipitation of the reactive mesogen.

However, in the present invention, the reactive mesogen is included in an additive form in the alignment layer, and the reactive mesogen is included in a content of 15 wt % to 50 wt % in the alignment layer.

This is because in the alignment layer of the present invention, two or more reactive mesogens are mixed in an additive form. That is, in the case where one reactive mesogen is added, the reactive mesogen has solubility of 15 wt % or less, but in the case where two reactive mesogens are added, the reactive mesogens each have solubility of 15 wt % or less, and thus, finally, the reactive mesogens may have solubility of 30 wt %.

In this case, the kind and the number of the reactive mesogen included in an additive form in the alignment layer are not limited. In the exemplary embodiment of the present invention, the additive of the alignment layer may include two compounds selected from the group consisting of compounds of Chemical Formulas 1-1 to 1-15, and each compound may be included in a content of 15 wt % or less in the alignment layer.

Further, in the exemplary embodiment, the additive may include each of the compound of Chemical Formula 1-2 and the compound of Chemical Formula 1-3 in a content of 15 wt % or less.

FIGS. 5A to 5D illustrate light leakage defect according to content of the reactive mesogen. Referring to FIGS. 5A to 5D, in the case where the content of the reactive mesogen is 1000 ppm (FIG. 5A) and 1600 ppm (FIG. 5B), light leakage is not absolutely observed. However, in the case where the content of the reactive mesogen is 2300 ppm (FIG. 5C), light leakage due to precipitation of the reactive mesogen is observed in some regions. It can be confirmed that in the case where the content of the reactive mesogen is 3000 ppm (FIG. 5D), great light leakage is observed in the entire alignment layer.

That is, in the case where the single reactive mesogen is included in an additive form, an excessive amount cannot be added because of limited solubility of the reactive mesogen, and as confirmed in FIGS. 5A to 5D, in the case where the content of the reactive mesogen is increased, a light leakage defect occurs.

However, in the alignment layer of the present invention, the different reactive mesogens are mixed to be included in an additive form, and thus solubility of the reactive mesogen is increased. That is, when solubility of one reactive mesogen is 15 wt %, since two kinds or more of mixed reactive mesogens each have solubility of 15 wt %, in the case where two kinds of the reactive mesogens are added, in the alignment layer, solubility of the reactive mesogen is 30 wt %.

Figure 6:
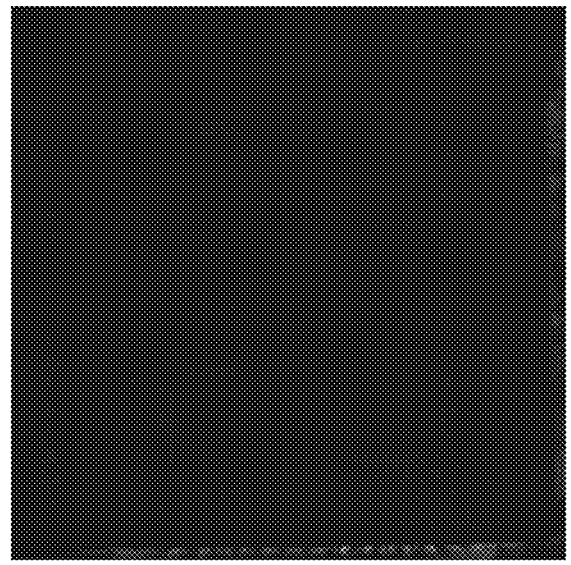
FIG. 6 is an image of an alignment layer where 1500 ppm of a compound of Chemical Formula 1-2 and 1500 ppm of a compound of Chemical Formula 1-3 are mixed in an additive form.

FIG. 6 is an image of an alignment layer where 1500 ppm of the compound of Chemical Formula 1-2 and 1500 ppm of the compound of Chemical Formula 1-3 are mixed in an additive form. In FIG. 6, even though the total reactive mesogen content added is 3000 ppm, light leakage is not observed.

That is, in the present invention, the reactive mesogen content may be increased by adding two kinds or more of reactive mesogens in an additive form, and in the case where the content of the reactive mesogen is increased, and a pretilt of a liquid crystal may be formed more well, improving afterimage.

Figure 7:
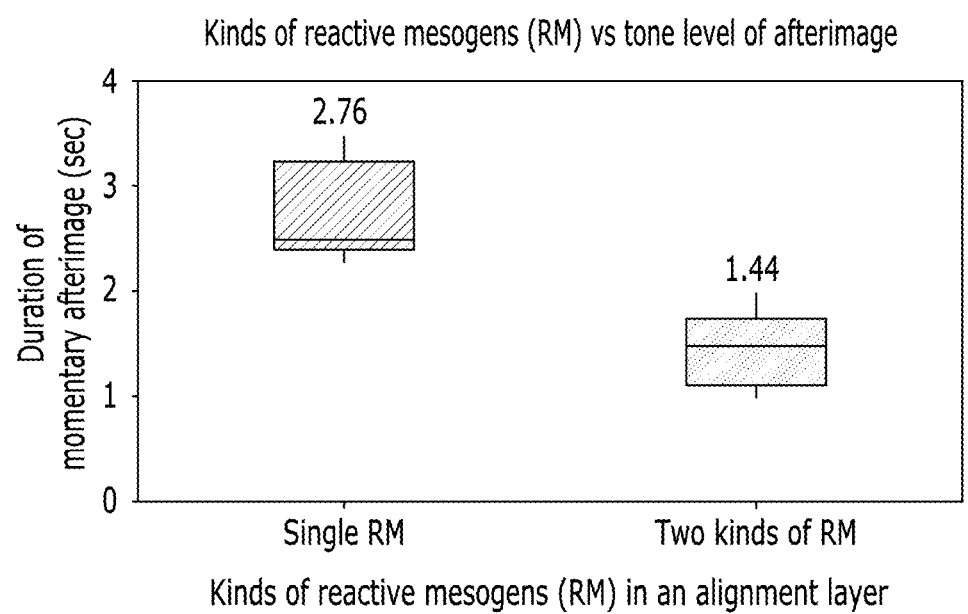
FIG. 7 is a graph obtained by evaluating a momentary afterimage in a Comparative Example and an Example of the present invention.
Figure 8:
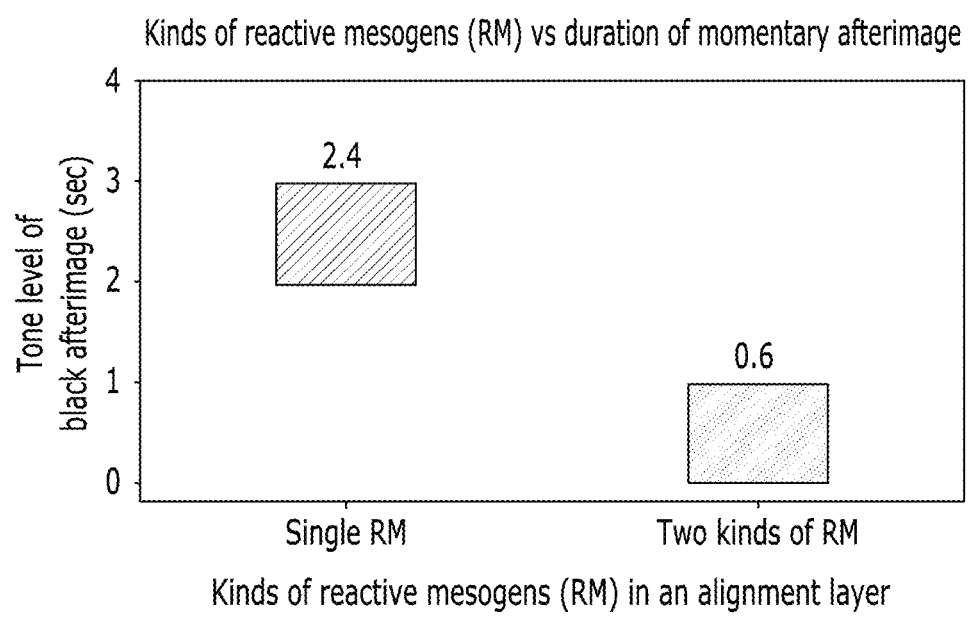
FIG. 8 is a graph obtained by evaluating a black afterimage in the Comparative Example and the Example of the present invention.

FIG. 7 is a graph obtained by evaluating a momentary afterimage in a Comparative Example and an Example of the present invention. FIG. 8 is a graph obtained by evaluating a black afterimage in the Comparative Example and the Example of the present invention. Referring to FIG. 7, it could be confirmed that as compared to the alignment layer including one kind of reactive mesogen, in the case of the alignment layer including two kinds of reactive mesogens, the momentary afterimage was significantly improved.

That is, it could be confirmed that the level of the momentary afterimage using the single reactive mesogen of the Comparative Example of the present invention was 2.76, but the level of the momentary afterimage using the two kinds of reactive mesogens of the Example of the present invention was 1.44, and thus the momentary afterimage was improved by about two times.

Further, referring to FIG. 8, it could be confirmed that the level of the black afterimage using the single reactive mesogen of the Comparative Example of the present invention was 2.4, but the level of the black afterimage using the two kinds of reactive mesogens of the Example of the present invention was 0.6, and thus the black afterimage was improved by four times or more.

Then, hereinafter, a main chain of the alignment layer of the present invention will be described. The reactive mesogen is included in an additive form, and the main chain of the alignment layer of the present invention may include a compound represented by the following Chemical Formula 2.

[Chemical Formula 2]

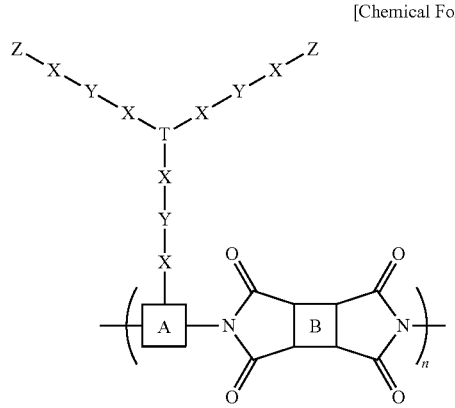

In Chemical Formula 2,

A may be any one of

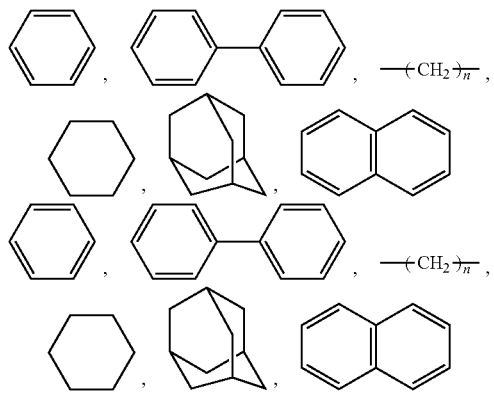

B may be any one of

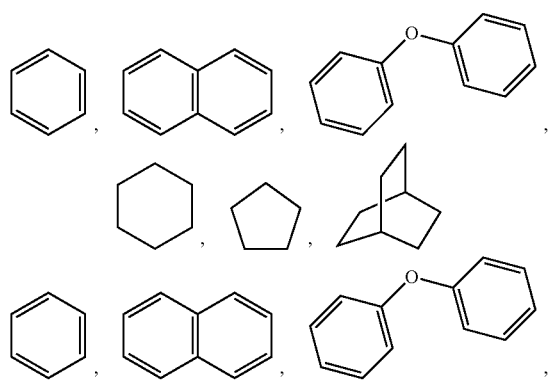

-continued

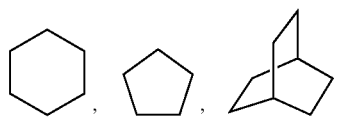

X may be any one of

Y may be any one of

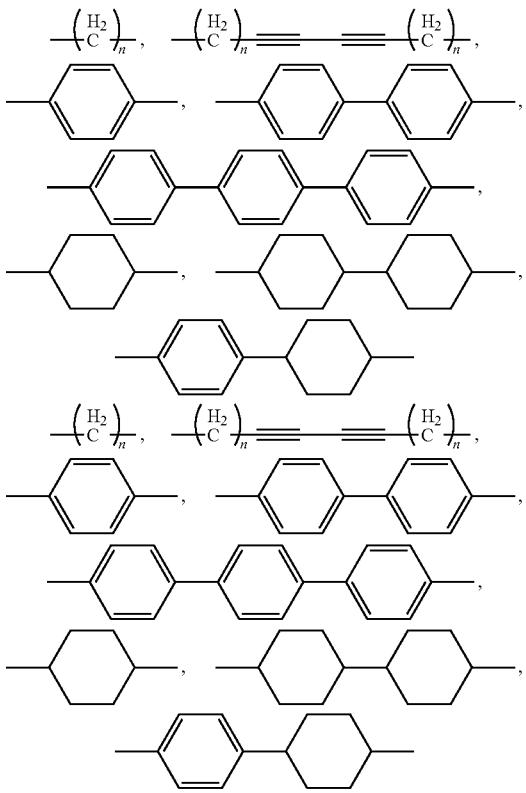

N may be any one of

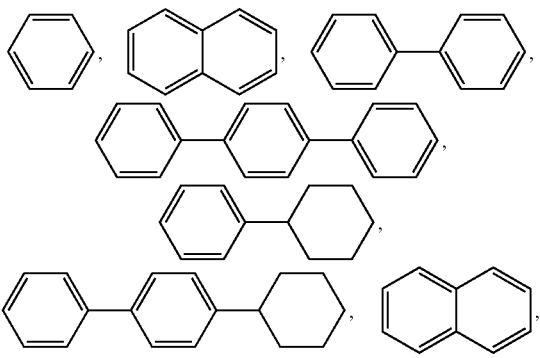

37
-continued

Z may be any one of

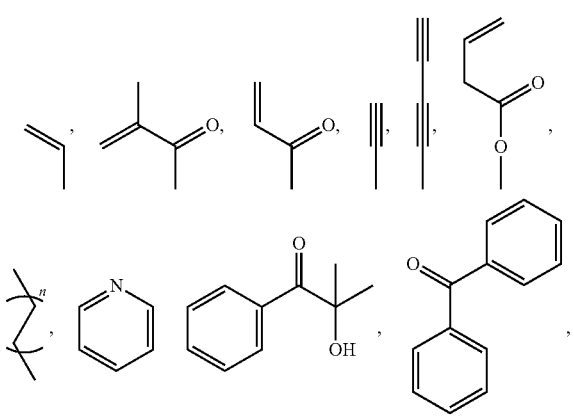

38
-continued

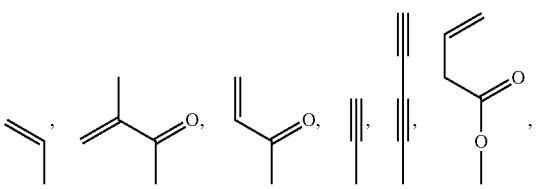

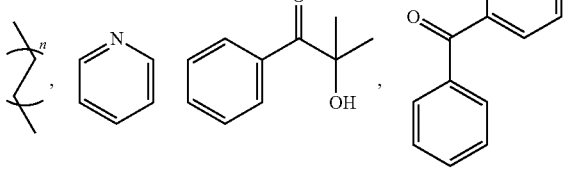

T is any of

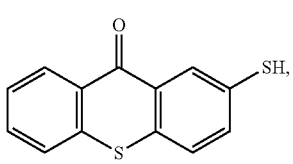

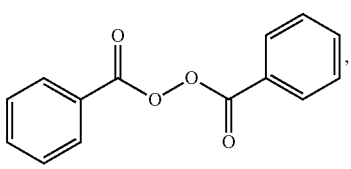

n is 0 to 20.

Chemical Formula 2 represents a representative structure of the alignment layer. That is, as long as the alignment layer has the structure of Chemical Formula 2, the alignment layer can be applied without limitation.

In the exemplary embodiment of the present invention, the alignment layer may include a compound represented by the following Chemical Formula 4 and a compound represented by the following Chemical Formula 5.

[Chemical Formula 4]

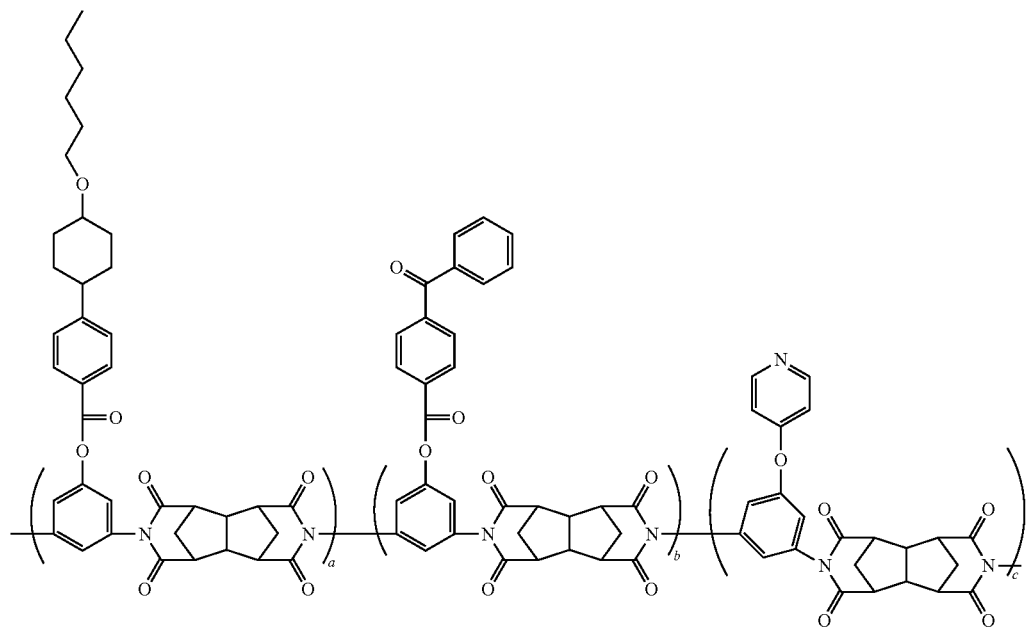

[Chemical Formula 5]

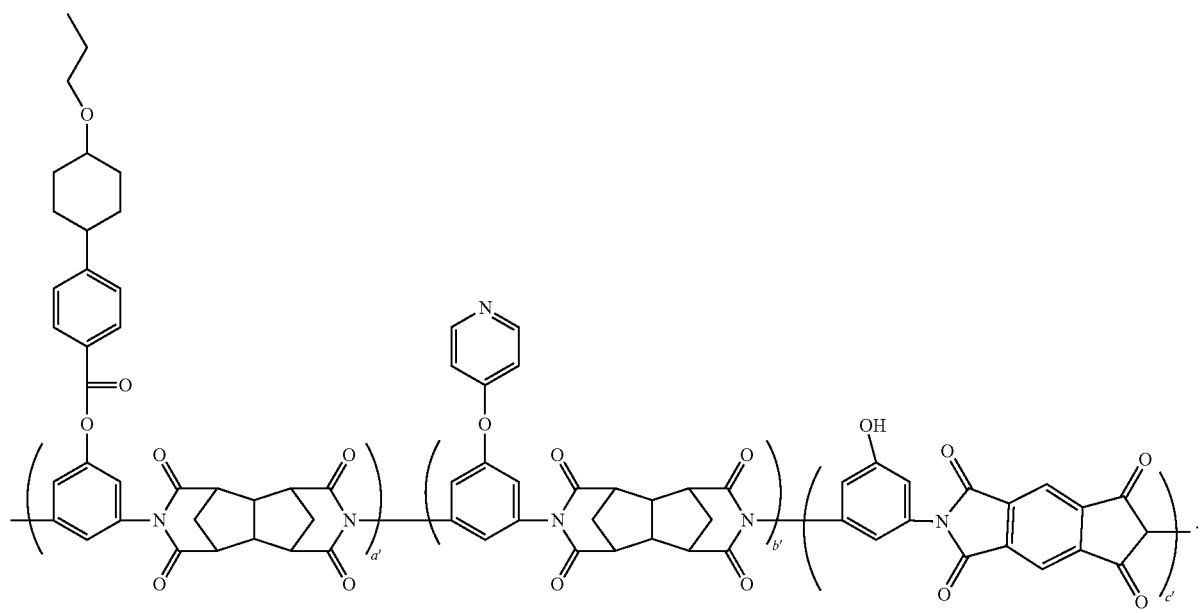

In this case, a ratio of a, b, and c of Chemical Formula 4 may be 5:3:2, but is not limited thereto.

Further, a ratio of a', b', and c' of Chemical Formula 5 may be 3:3:4, but is not limited thereto.

The compounds of Chemical Formulas 4 and 5 may be mixed at a weight ratio of 7:3. As will be described below, the alignment layer may be manufactured by mixing the compound of Chemical Formula 4 and the compound of Chemical Formula 5 at a predetermined weight ratio in the alignment layer solution applied when the alignment layer is formed and dissolving the aforementioned reactive mesogens of Chemical Formulas 1-1 to 1-15 at a predetermined concentration ratio therein.

Then, hereinafter, a method of manufacturing a liquid crystal display of the present invention will be described with reference to FIGS. 9 and 10A to 10E.

Figure 9:
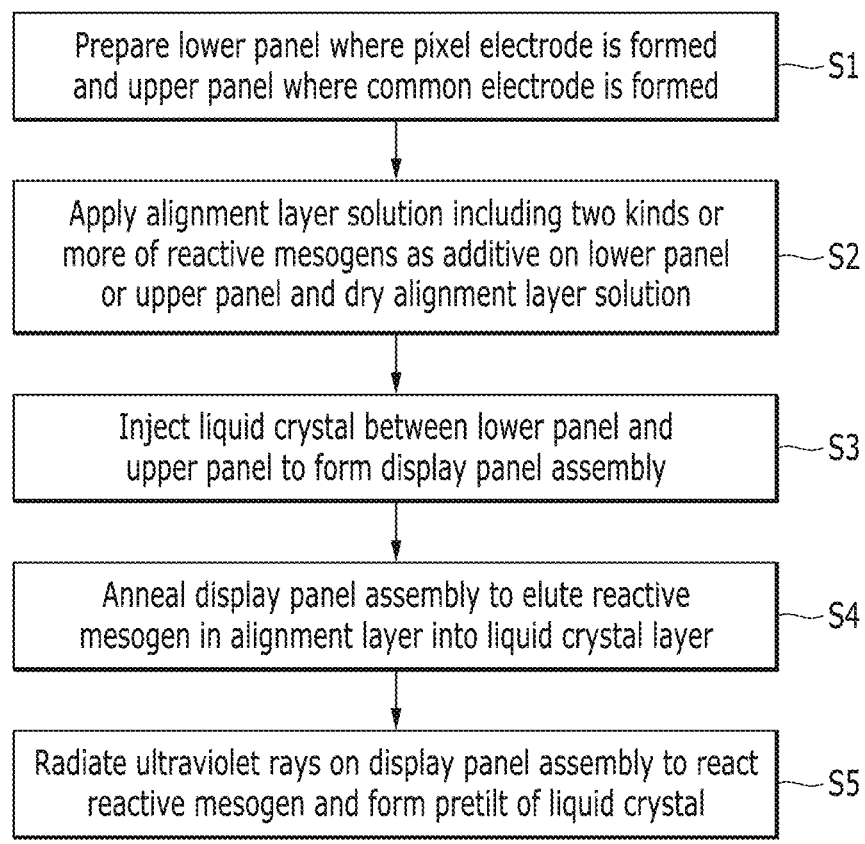
FIG. 9 is a flowchart illustrating a method of manufacturing a liquid crystal display of the present invention.

FIG. 9 is a flowchart illustrating the method of manufacturing the liquid crystal display of the present invention. FIGS. 10A to 10E schematically illustrate the method of manufacturing the liquid crystal display of the present invention.

The method of manufacturing the liquid crystal display of the present invention includes preparing a lower panel where a pixel electrode is formed and an upper panel where a common electrode is formed, applying an alignment layer solution including two kinds or more of reactive mesogens as an additive on the lower panel or the upper panel, and drying the alignment layer solution, injecting a liquid crystal between the lower panel and the upper panel to form a display panel assembly, annealing the display panel assembly to elute the reactive mesogen in an alignment layer into a liquid crystal layer, and radiating ultraviolet rays on the display panel assembly to react the reactive mesogen and thus form a pretilt.

First, in a step of preparing of the lower panel where the pixel electrode is formed and the upper panel where the common electrode is formed, the description of the prepared lower panel and upper panel is the same as the aforementioned description of the lower panel and the upper panel. Therefore, a detailed description of constituent elements will be omitted. In the present step, the lower panel and the upper panel like FIGS. 2 and 3 may be prepared, but are illustrative, and in the case where the pixel electrode is positioned in the lower panel and the common electrode is positioned in the upper panel, the display panels can be used without limitation.

Next, a step of applying the alignment layer solution including two kinds or more of reactive mesogens as the additive on the lower panel or the upper panel and drying the alignment layer solution will be described.

In the present step, the applied alignment layer solution includes two kinds or more of reactive mesogens, and also includes the polymer material constituting the main chain.

In this case, the alignment layer material included in the alignment layer solution may be a compound represented by the following Chemical Formula 2.

[Chemical Formula 2]

In Chemical Formula 2,
A may be any one of

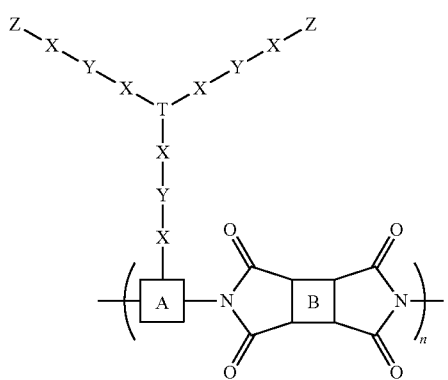

B may be any one of

X may be any one of $$-O-, \quad -O-\overset{O}{\underset{\|}{C}}- \quad -O-, \quad -O-\overset{O}{\underset{\|}{C}}-$$

Y may be any one of $$-\left(\overset{H_2}{C}\right)_n-, \quad -\left(\overset{H_2}{C}\right)_n\!\!=\!\!=\!\!\left(\overset{H_2}{C}\right)_n-,$$

(aromatic and cyclohexyl linker structures)

$$-\left(\overset{H_2}{C}\right)_n-, \quad -\left(\overset{H_2}{C}\right)_n\!\!=\!\!=\!\!\left(\overset{H_2}{C}\right)_n-,$$

(aromatic and cyclohexyl linker structures)

M may be any one of
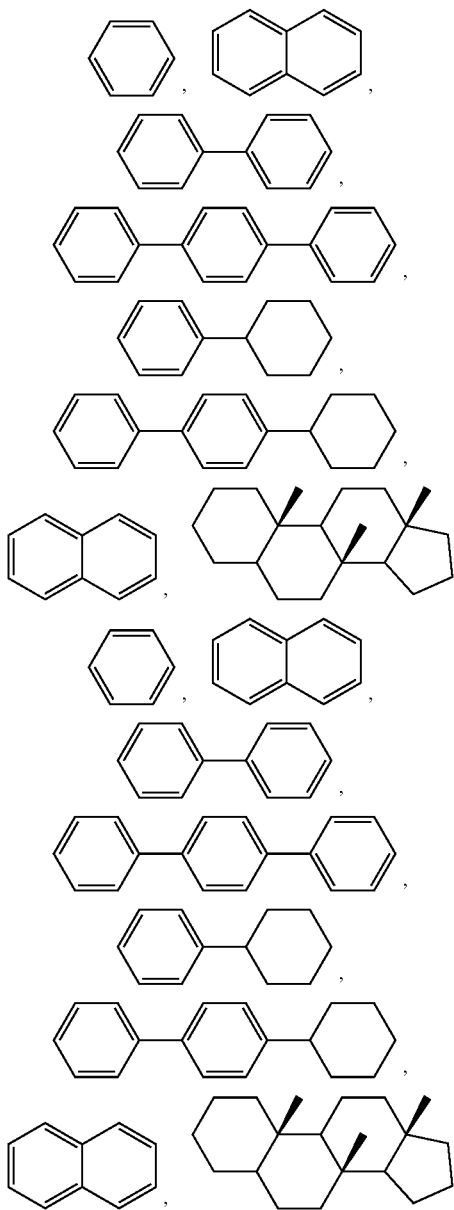
Z may be any one of
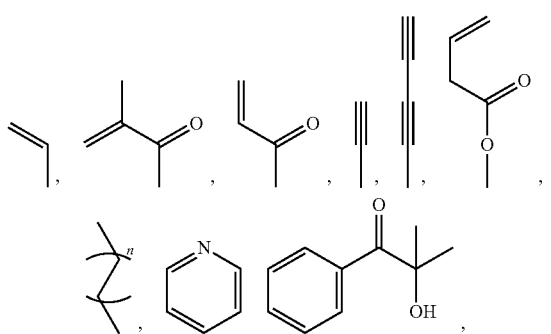
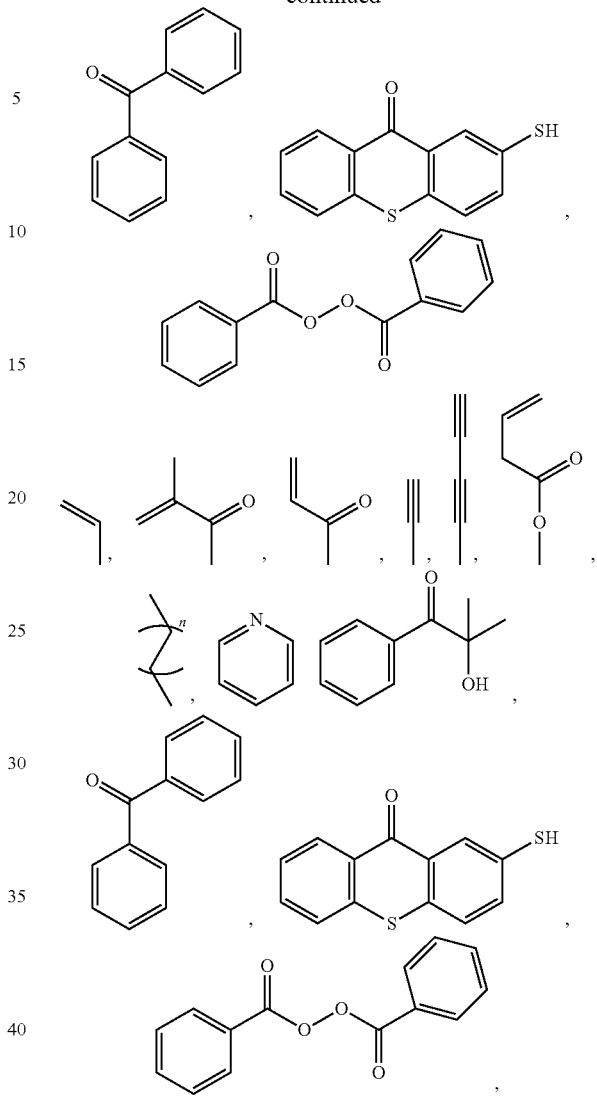
T is any of
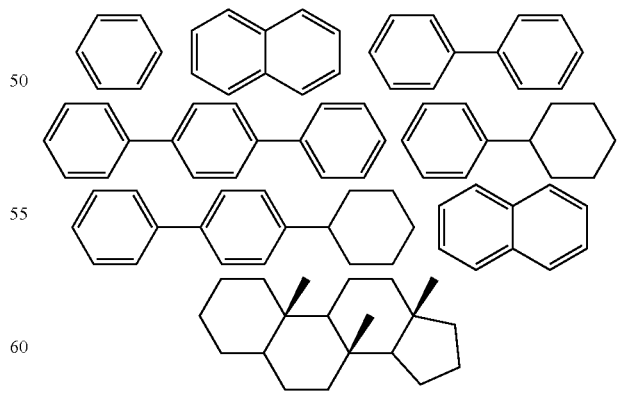
n is 0 to 20.
Alternatively, the alignment layer material included in the alignment layer may be a mixture of a compound represented by the following Chemical Formula 4 and a compound represented by the following Chemical Formula 5.

[Chemical Formula 4]

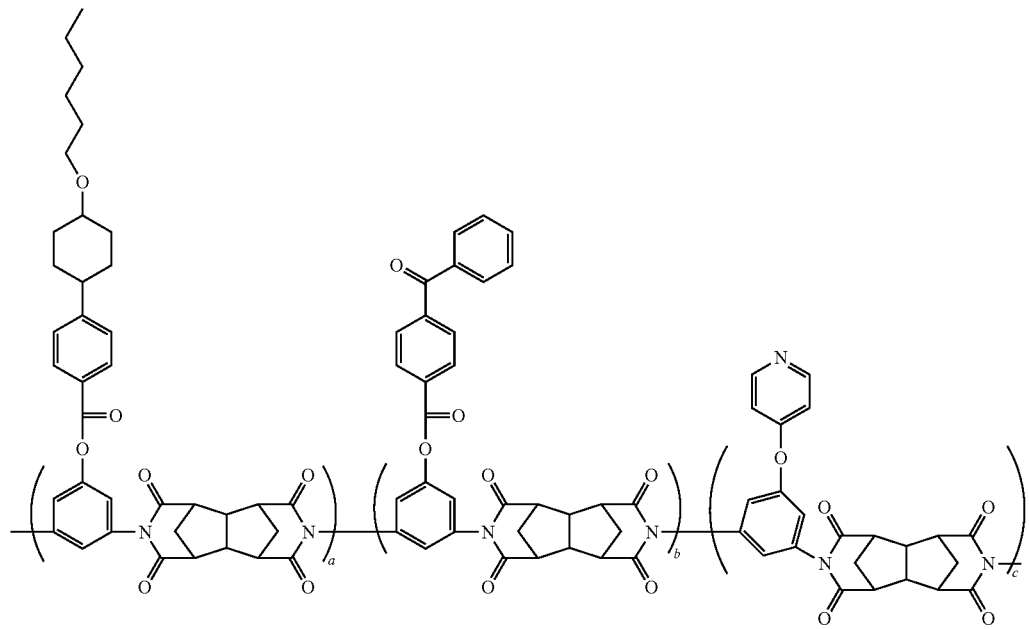

[Chemical Formula 5]

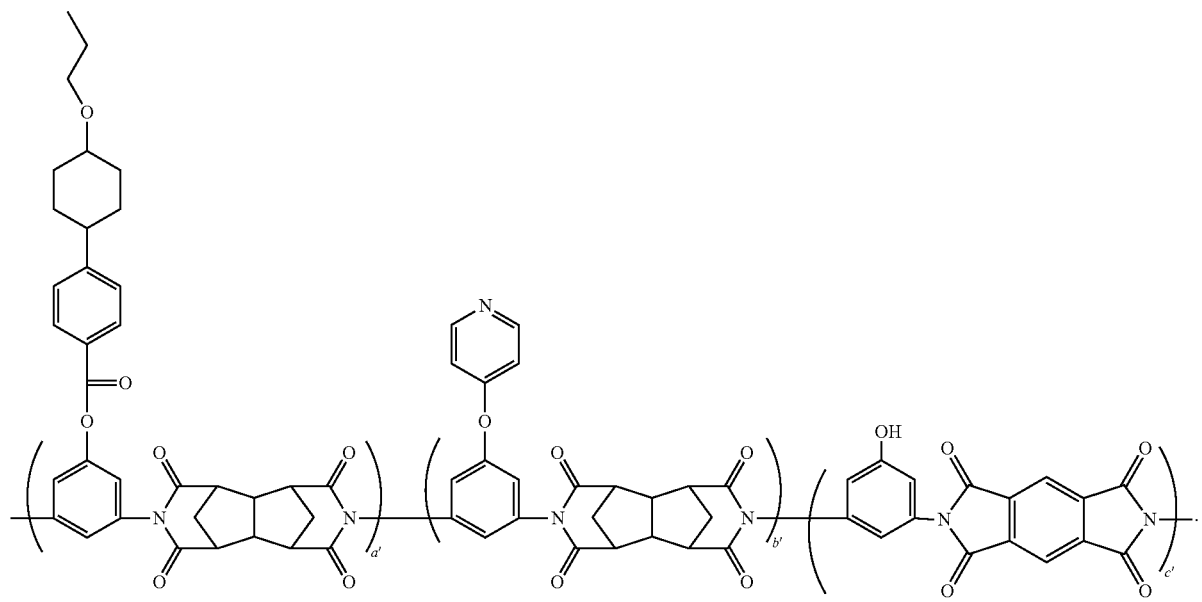

In this case, a ratio of a, b, and c of Chemical Formula 4 may be 5:3:2, but is not limited thereto.

Further, a ratio of a', b', and c' of Chemical Formula 5 may be 3:3:4, but is not limited thereto.

The compounds of Chemical Formulas 4 and 5 may be mixed at a weight ratio of 7:3.

Further, the alignment layer solution includes two or more reactive mesogens selected from the following Chemical Formulas 1-1 to 1-15.

[Chemical Formula 1-1 to 1-15]
(1-1)
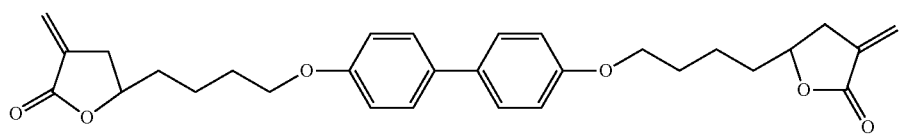
(1-2)
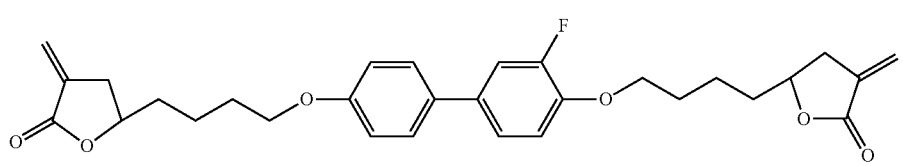
(1-3)
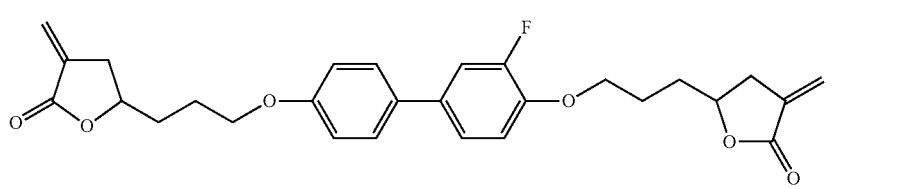
(1-4)
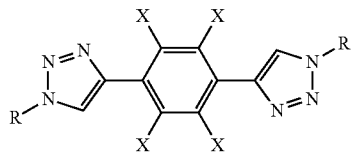
(1-5)
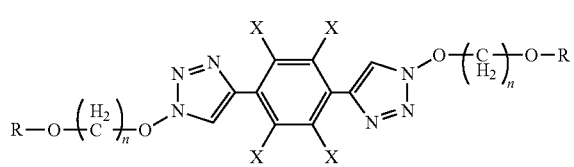
(1-6)
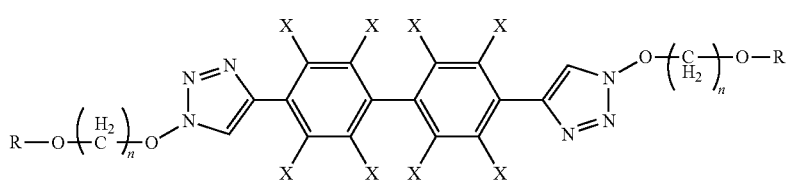
(1-7)
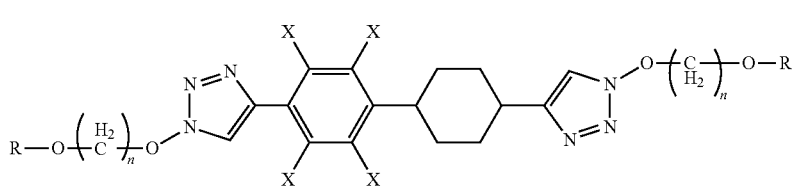
(1-8)
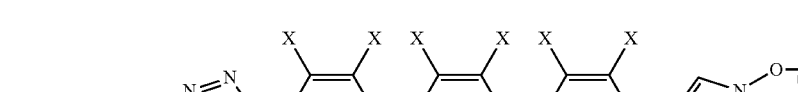
(1-9)
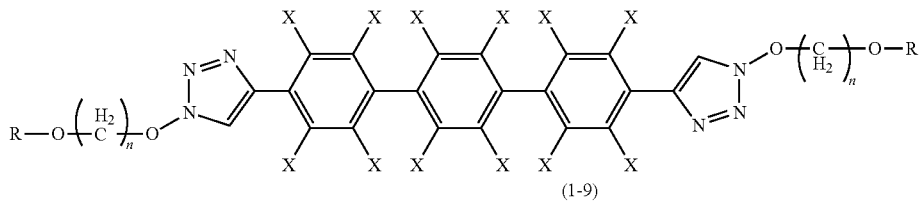
(1-10)
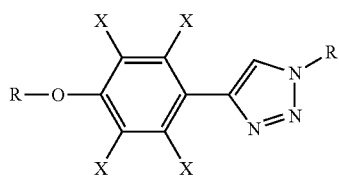
(1-11)
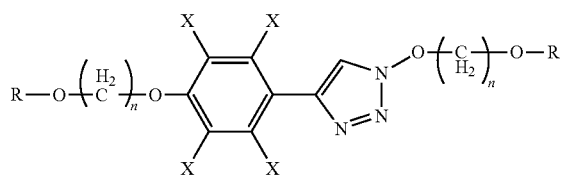
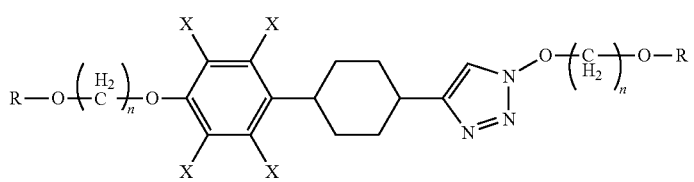

-continued

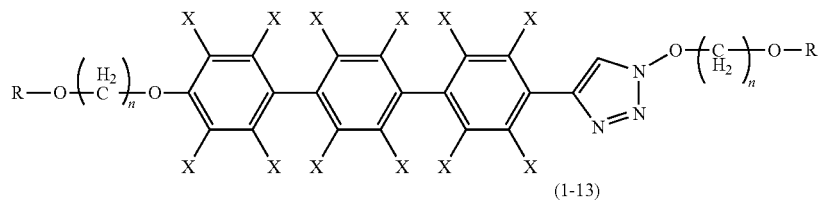

(1-12)

(1-13)

(1-14)

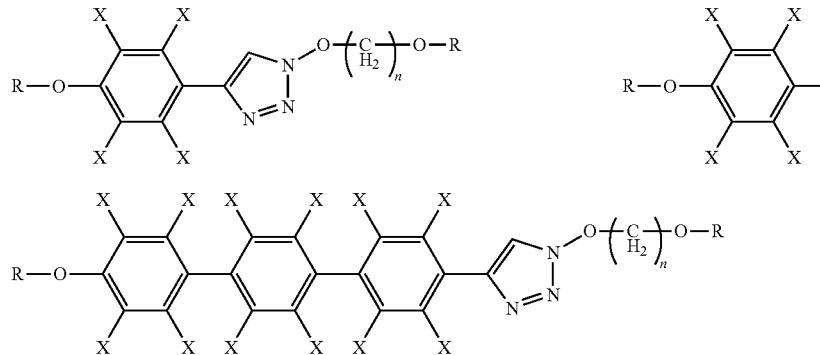

(1-15)

In Chemical Formulas 1-4 to 1-15, X's are each independently H, CH$_3$, (CH$_2$)$_n$CH$_3$, F, Br, I, OH, C$_3$H$_7$, NH$_2$, or CN, R's are each independently any one of

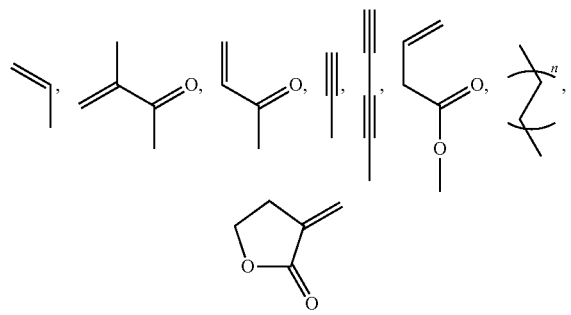

and n is 1 to 20.

The reactive mesogen may be included in a content of 15 wt % to 50 wt % based on the alignment layer solution.

In the exemplary embodiment of the present invention, the alignment layer solution may include two compounds selected from the group consisting of compounds of Chemical Formulas 1-1 to 1-15 as the additive, and each compound may be included in a content of 15 wt % or less in the alignment layer solution.

Further, in the exemplary embodiment, the alignment layer solution of the present step may include each of the compound of Chemical Formula 1-2 and the compound of Chemical Formula 1-3 in a content of 15 wt % or less.

As described above, two kinds or more of reactive mesogens are added in an additive form to increase solubility of the reactive mesogen to the alignment layer.

Figure 10A:
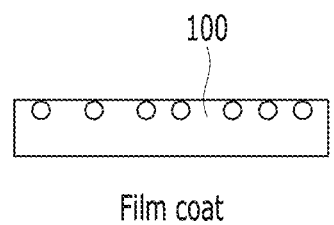
FIGS. 10A to 10E schematically illustrate the method of manufacturing the liquid crystal display of the present invention.

The aforementioned alignment layer solution is applied on the lower panel and the upper panel, and then dried. FIG. 10A illustrates the display panel of a step where application and drying of the alignment layer solution are finished.

Figure 10B:
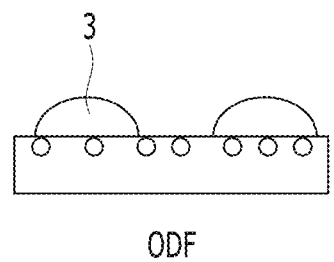
Figure 10C:
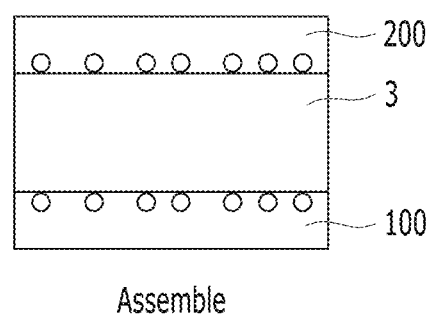

Next, the liquid crystal is injected between the lower panel and the upper panel to form the display panel assembly. The display panel assembly of steps of FIGS. 10B and 10C is formed by injecting the liquid crystal and forming the assembly.

In the aforementioned step, the reactive mesogen (represented by circles) included in an additive form in the alignment layer solution is included in the alignment layer dried in the prior step, and the liquid crystal layer exists thereon.

Next, the display panel assembly is annealed to elute the reactive mesogen in an alignment layer into the liquid crystal layer.

Figure 10D:
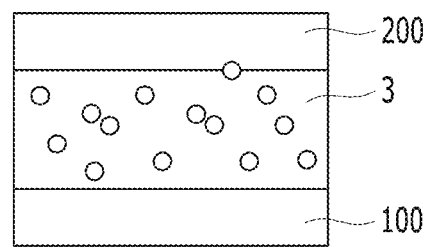

FIG. 10D illustrates a view where the reactive mesogen is eluted in the present step. That is, if heat is applied to the display panel assembly to perform annealing, the reactive mesogen included in an additive form in the dried alignment layer is eluted in a direction of the liquid crystal layer to be mixed with the liquid crystal layer.

Next, the ultraviolet rays are radiated on the display panel assembly to react the reactive mesogen and thus form the pretilt.

Figure 10E:
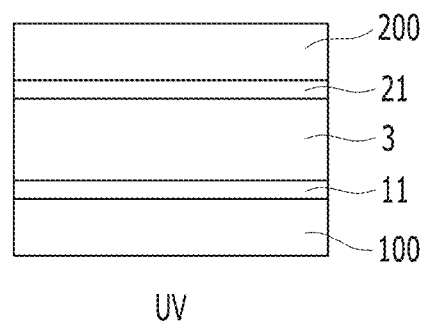

FIG. 10E illustrates the present step. If the voltage is applied to the display panel assembly to align the liquid crystal in a predetermined direction and then the ultraviolet rays are radiated on the display panel assembly, the reactive mesogen dispersed in the liquid crystal layer is photocured. Therefore, while a curing reaction of a portion of the liquid crystal layer and the reactive mesogen occurs by a photoreaction of the reactive mesogen, as illustrated in FIG. 10E, a reactive mesogen layer is formed on the lower panel and the upper panel. A portion of the liquid crystal has a fixed pretilt by photocuring of the reactive mesogen to increase a response speed of the liquid crystal and improve an afterimage when the display device is subsequently driven.

Although not illustrated in the drawings, the method may further include, after the radiating of the ultraviolet rays on the display panel assembly to react the reactive mesogen and thus form the pretilt, additionally radiating the ultraviolet rays to remove an unreacted residual reactive mesogen.

This secondary ultraviolet rays exposure is to remove the unreacted residual reactive mesogen, and in the aforementioned step, the exposure is performed while an electric field is not applied to the display panel assembly. Through the aforementioned step, the residual reactive mesogen that is not reacted but remains is removed, and thus water stains, vertical lines, and the like of the alignment layer may be improved.

As described above, in the liquid crystal display of the present invention and a method of manufacturing the same, two kinds or more of reactive mesogens are included in an additive form in an alignment layer to increase solubility of the reactive mesogen to the alignment layer. Therefore, an amount of the reactive mesogen in the alignment layer may be increased, and an afterimage of the liquid crystal display is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

GL, 121: Gate line
RL, 131: Divided voltage reference voltage line
DL, 171: Data line
Clca, Clab: Liquid crystal capacitor
Qa, Qb, Qc: Switching element (thin film transistor)
110, 210: Substrate
124a, 124b, 124c: Gate electrode
140: Gate insulating layer
154a, 154b, 154c, 157: Semiconductor
163a, 165a, 163b, 165b, 163c, 165c: Ohmic contact
173a, 173b, 173c: Source electrode
175a, 175b, 175c: Drain electrode
180p, 180q: Passivation layer
191a, 191b: Sub-pixel electrode
220: Light blocking member
230: Color filter
11, 21: Alignment layer While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first insulation substrate where a pixel electrode is formed;
a second insulation substrate where a common electrode is formed while the second insulation substrate faces the first insulation substrate;
a first alignment layer positioned in the first insulation substrate;
a second alignment layer positioned in the second insulation substrate; and
a liquid crystal layer positioned between the first insulation substrate and the second insulation substrate,
wherein the first alignment layer and the second alignment layer include an additive, and the additive is a mixture of two or more reactive mesogens selected from the group consisting of the following Chemical Formulas 1-1 to 1-15:

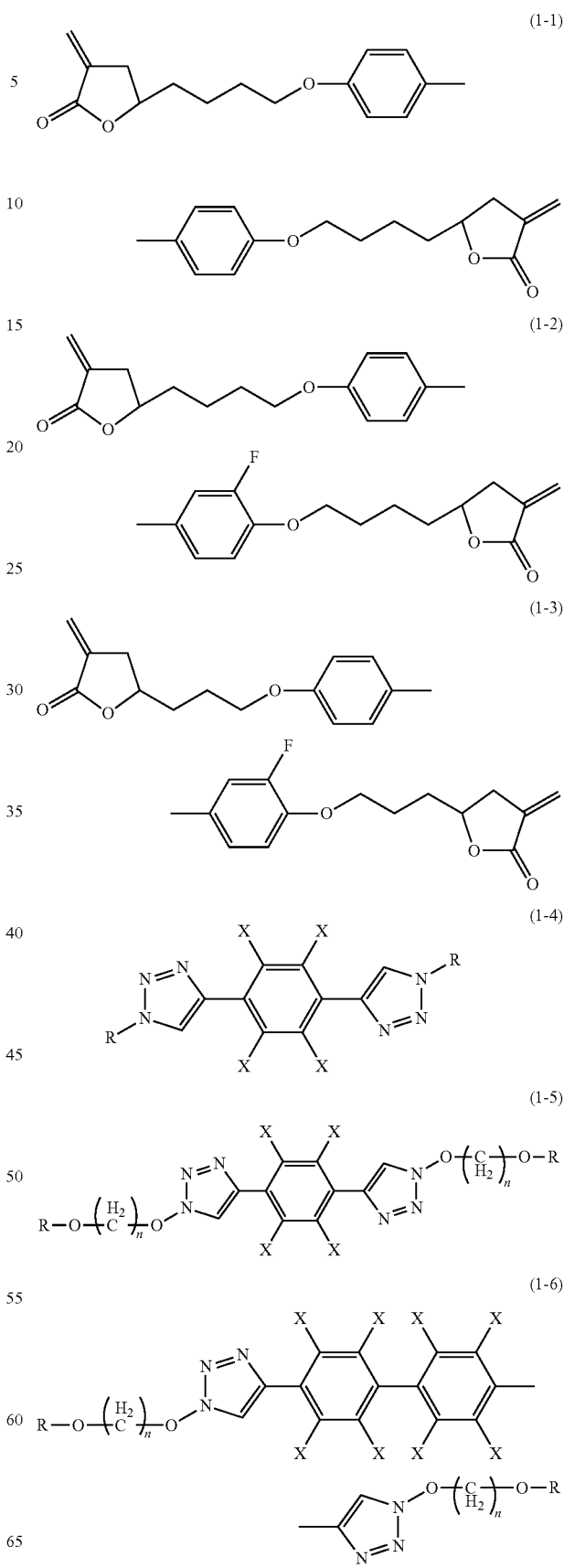

-continued (1-7)
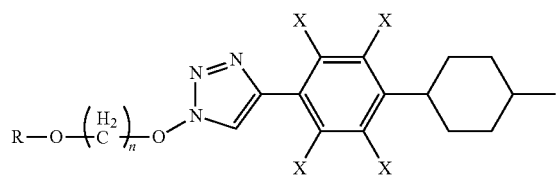

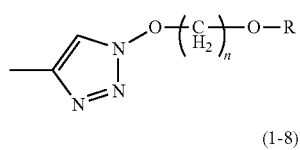

(1-8)
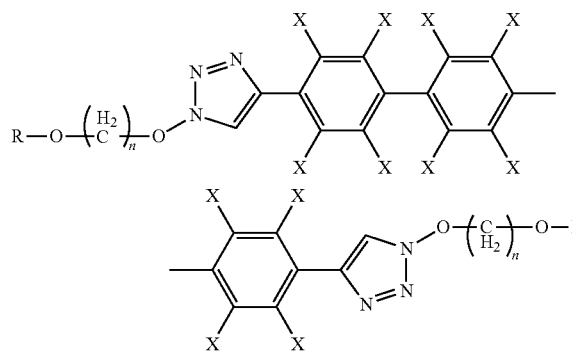

(1-9)
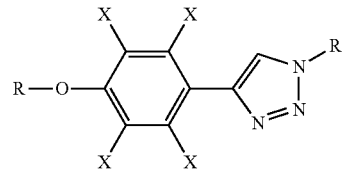

(1-10)
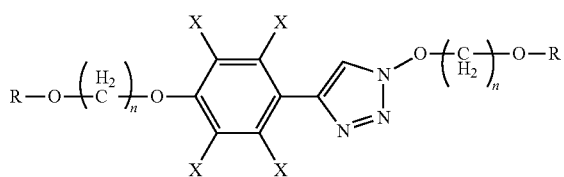

(1-11)
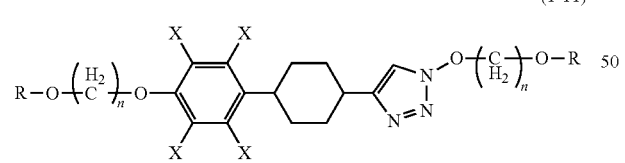

(1-12)
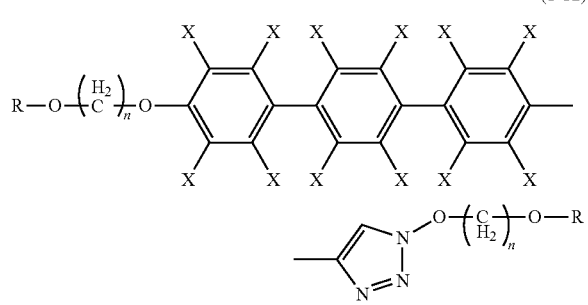

-continued (1-13)
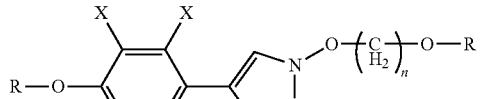

(1-14)
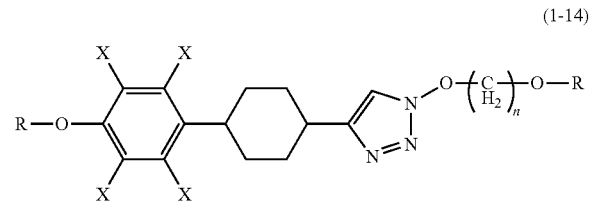

(1-15)
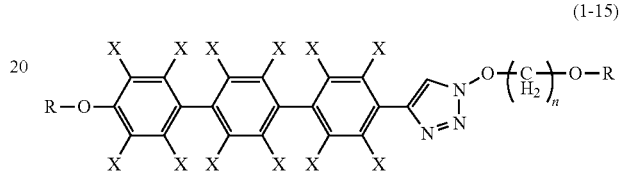

in Chemical Formulas 1-4 to 1-15,

X's are each independently H, $CH_3$, $(CH_2)_nCH_3$, F, Br, I, OH, $C_3H_7$, $NH_2$, or CN, R's are each independently any one of

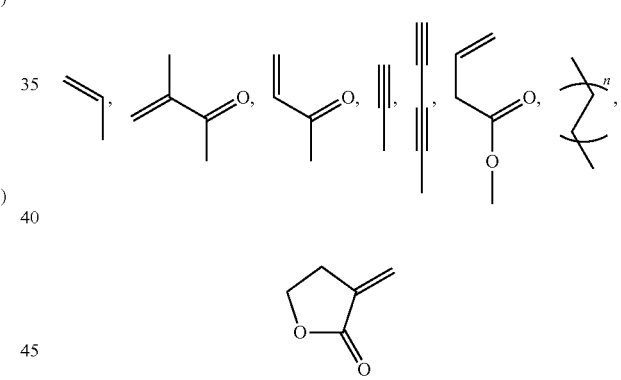

and n is 1 to 20.

2. The liquid crystal display of claim 1, wherein the additive is included in a content of 15 wt % to 50 wt % in the alignment layer.

3. The liquid crystal display of claim 1, wherein the additive includes two compounds selected from the group consisting of compounds of Chemical Formulas 1-1 to 1-15, and each compound is included in a content of 15 wt % or less in the alignment layer.

4. The liquid crystal display of claim 1, wherein
the additive includes each of the compound of Chemical Formula 1-2 and the compound of Chemical Formula 1-3 in a content of 15 wt % or less.

5. The liquid crystal display of claim 1, wherein the alignment layer includes a compound represented by the following Chemical Formula 2:

(Chemical Formula 2)

in Chemical Formula 2,
A is any one of

B is any one of

X is any one of

Y is any one of

N is any one of

Z is any one of

T is any of
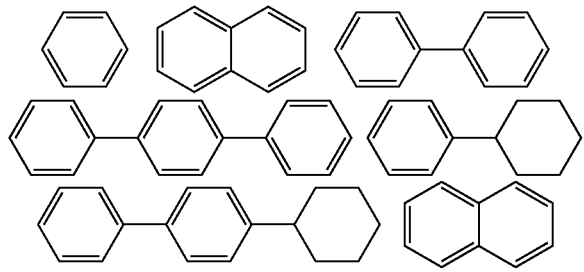
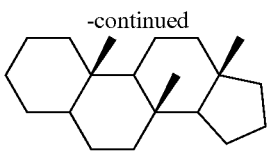
n is 1 to 20.
6. The liquid crystal display of claim 1, wherein the alignment layer includes a compound represented by the following Chemical Formula 4 and a compound represented by the following Chemical Formula 5:
[Chemical Formula 4]
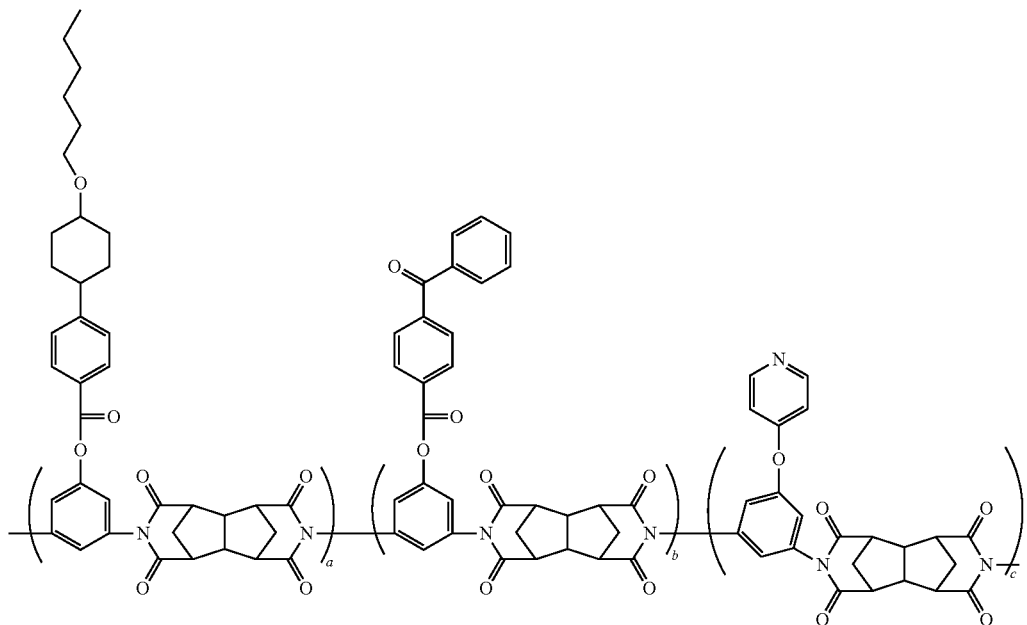
[Chemical Formula 5]
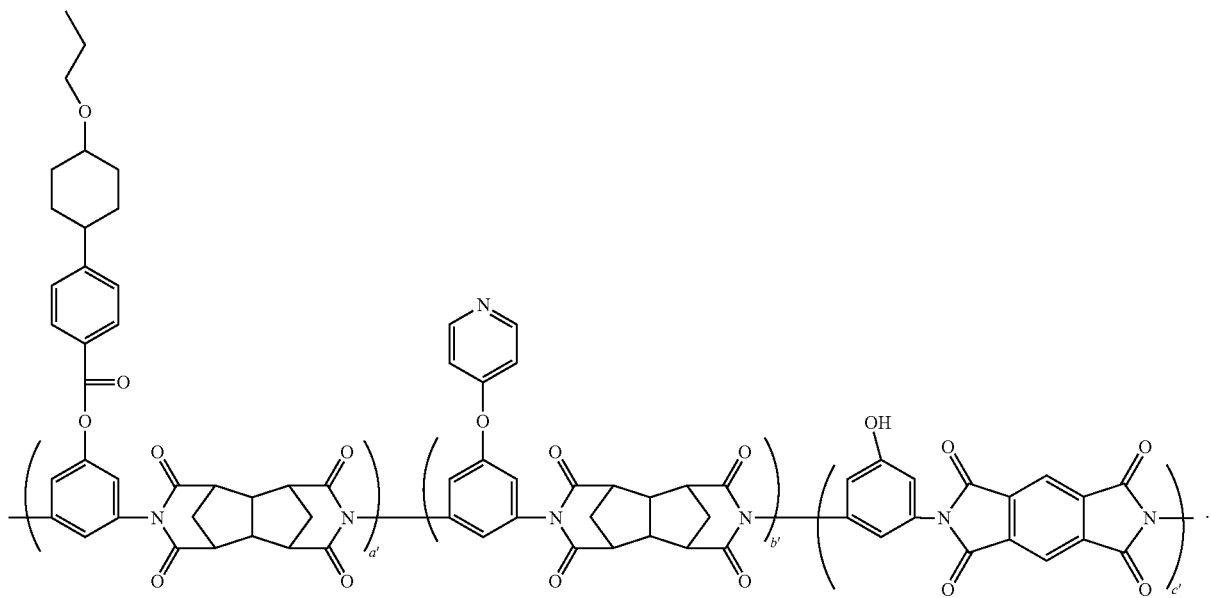

7. The liquid crystal display of claim 6, wherein a ratio of a, b, and c of Chemical Formula 4 is 5:3:2.

8. The liquid crystal display of claim 6, wherein a ratio of a', b', and c' of Chemical Formula 5 is 3:3:4.

9. The liquid crystal display of claim 6, wherein the compounds of Chemical Formulas 4 and 5 are mixed at a weight ratio of 7:3.

10. The liquid crystal display of claim 1, wherein the pixel electrode includes a cross-shaped stem portion and fine branch portions extending in four diagonal directions from the cross-shaped stem portion.

11. A method of manufacturing a liquid crystal display, comprising:

preparing a lower panel where a pixel electrode is formed and an upper panel where a common electrode is formed;

applying an alignment layer solution including two kinds or more of reactive mesogens as an additive on the lower panel or the upper panel, and drying the alignment layer solution;

injecting a liquid crystal between the lower panel and the upper panel to form a display panel assembly;

annealing the display panel assembly to elute the reactive mesogen in an alignment layer into a liquid crystal layer; and radiating ultraviolet rays on the display panel assembly to react the reactive mesogen and thus form a pretilt.

12. The method of claim 11, the additive is a mixture of two or more reactive mesogens selected from the group consisting of the following Chemical Formulas 1-1 to 1-15:

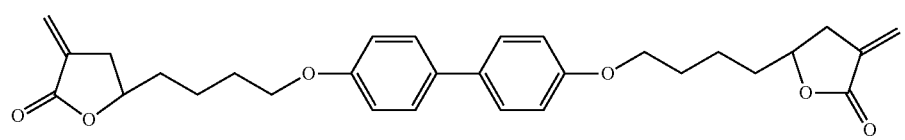
(1-1)

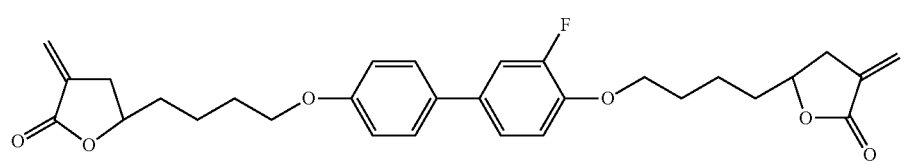
(1-2)

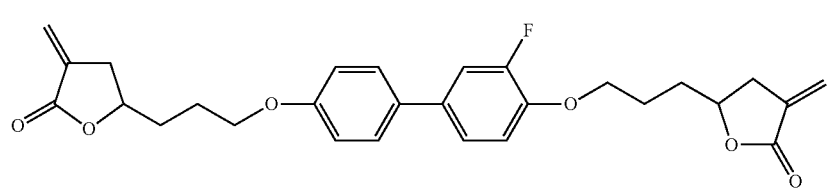
(1-3)

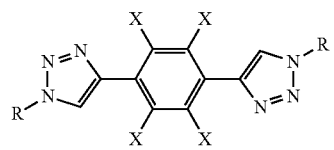
(1-4)

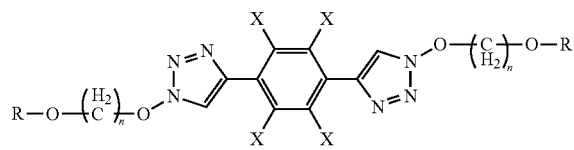
(1-5)

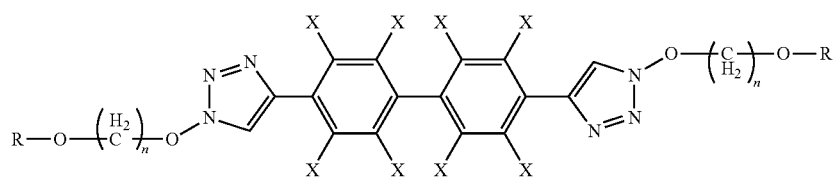
(1-6)

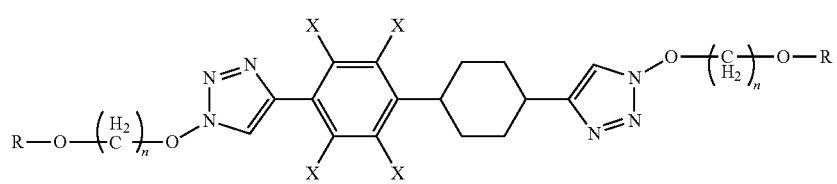
(1-7)

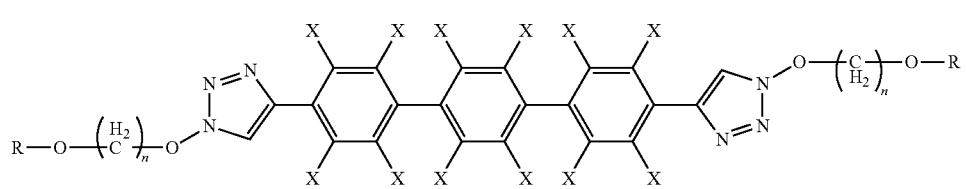
(1-8)

(1-9)
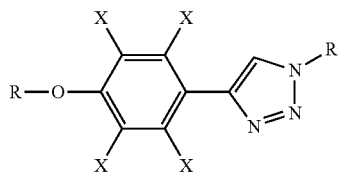

(1-10)
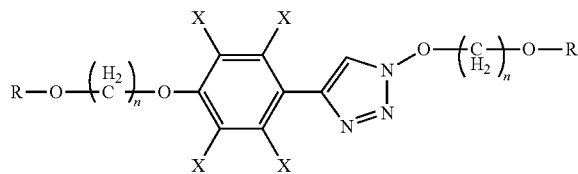

(1-11)
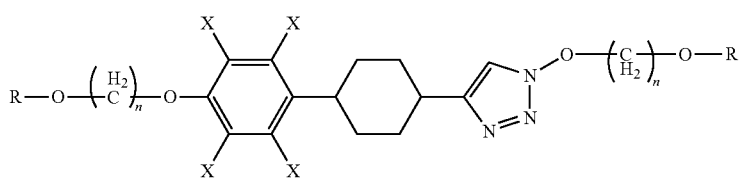

(1-12)
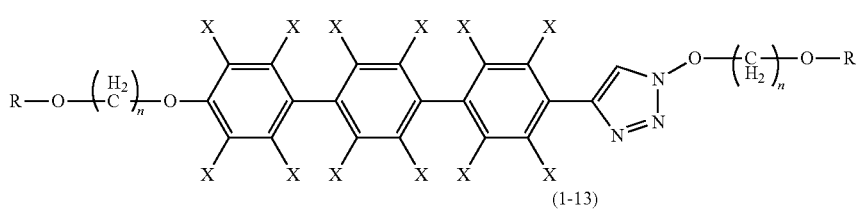

(1-13)
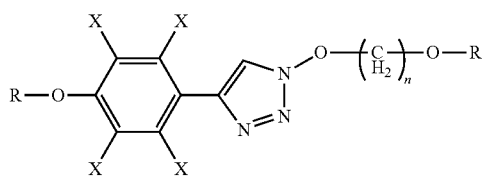

(1-14)
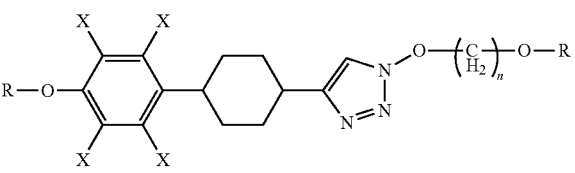

(1-15)
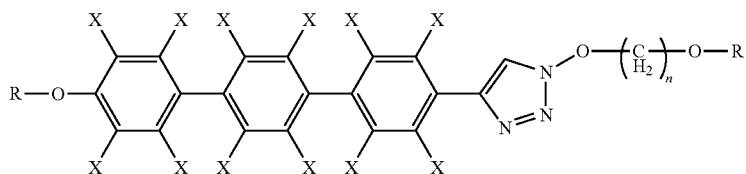

in Chemical Formulas 1-4 to 1-15,

X's are each independently H, $CH_3$, $(CH_2)_nCH_3$, F, Br, I, OH, $C_3H_7$, $NH_2$, or CN, R's are each independently any one of

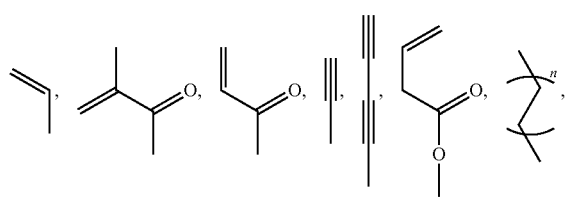

and n is 1 to 20.

13. The method of claim 12, the additive is included in a content of 15 wt % to 50 wt % in the alignment layer solution.

14. The method of claim 11, the additive includes two compounds selected from the group consisting of compounds of Chemical Formulas 1-1 to 1-15, and each compound is included in a content of 15 wt % or less based on the alignment layer solution.

15. The method of claim 11, wherein the radiating of the ultraviolet rays on the display panel assembly to react the reactive mesogen and thus form the pretilt is performed in a state where an electric field is applied to the display panel assembly.

16. The method of claim 15, further comprising after the radiating of the ultraviolet rays on the display panel assembly to react the reactive mesogen and thus form the pretilt, additionally radiating the ultraviolet rays to remove an unreacted residual reactive mesogen.

17. The method of claim 11, the alignment layer solution includes a compound represented by the following Chemical Formula 2:

(Chemical Formula 2)

in Chemical Formula 2,
A is any one of

B is any one of

X is any one of

Y is any one of

N is any one of

Z is any one of

T is any of
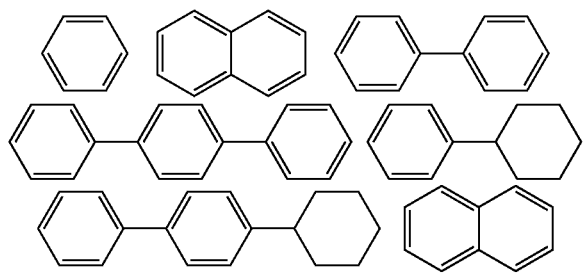
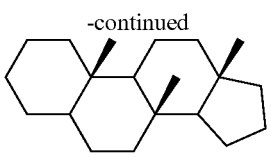
n is 1 to 20.
18. The method of claim 11, the alignment layer solution includes a compound represented by the following Chemical Formula 4 and a compound represented by the following Chemical Formula 5:
[Chemical Formula 4]
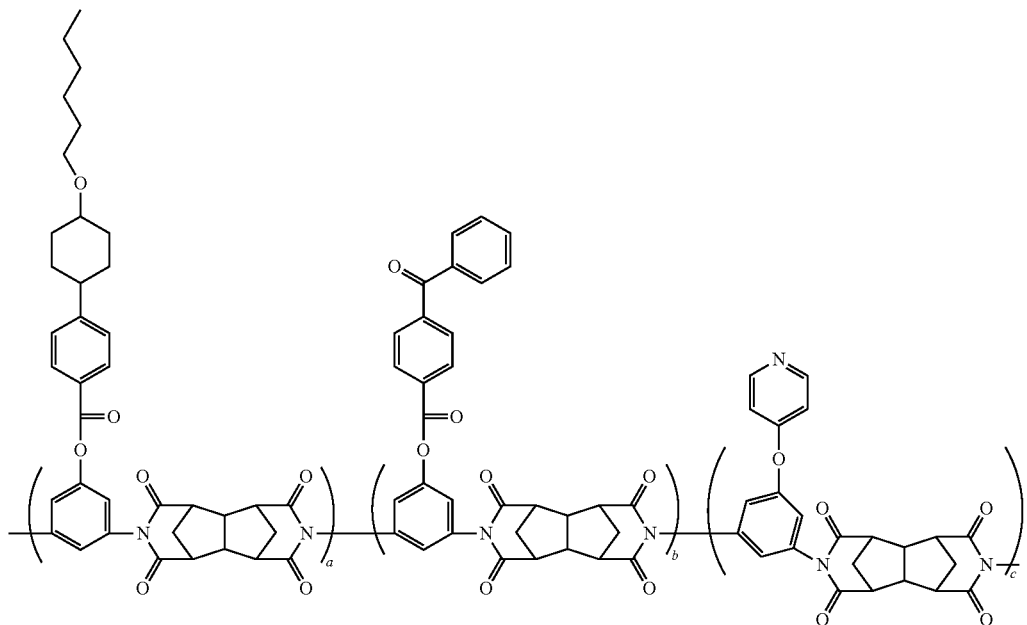
[Chemical Formula 5]
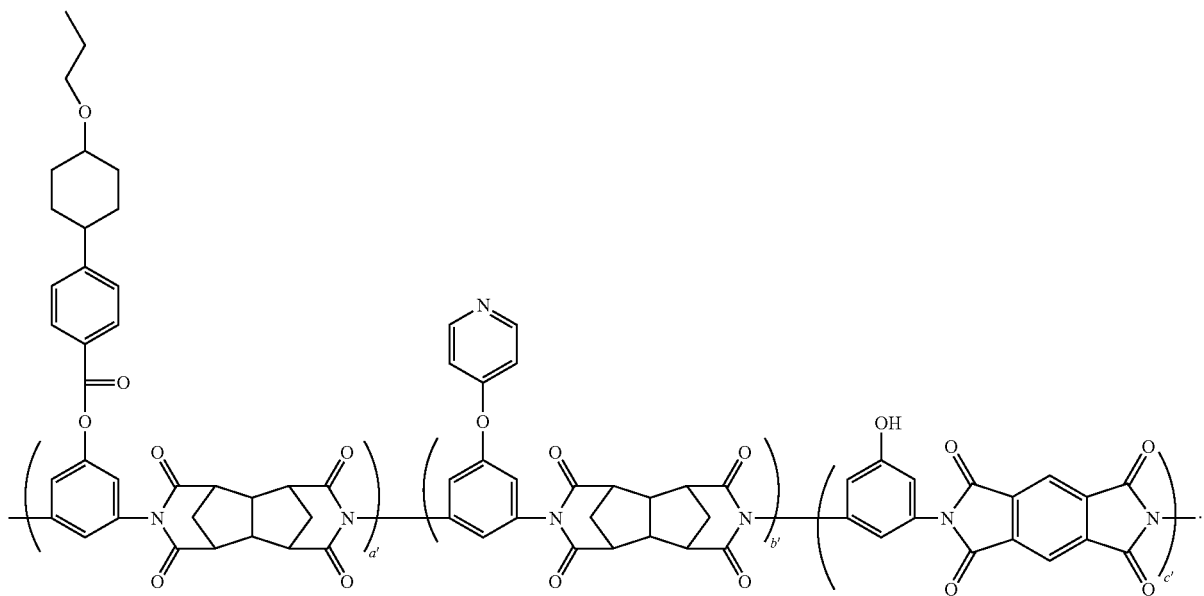

19. The method of claim 18, a ratio of a, b, and c of Chemical Formula 4 is 5:3:2, and a ratio of a', b', and c' of Chemical Formula 5 is 3:3:4.

20. The method of claim 18, wherein the compounds of Chemical Formulas 4 and 5 are mixed at a weight ratio of 7:3.

\* \* \* \* \*